US008106957B2

(12) United States Patent
Kondo et al.

(10) Patent No.: US 8,106,957 B2
(45) Date of Patent: *Jan. 31, 2012

(54) IMAGE SIGNAL PROCESSING APPARATUS, AND IMAGE SIGNAL PROCESSING METHOD

(75) Inventors: Tetsujiro Kondo, Tokyo (JP); Hideo Nakaya, Kanagawa (JP); Takashi Sawao, Tokyo (JP)

(73) Assignee: Sony Corporation, Tokyo (JP)

( * ) Notice: Subject to any disclaimer, the term of this patent is extended or adjusted under 35 U.S.C. 154(b) by 1134 days.

This patent is subject to a terminal disclaimer.

(21) Appl. No.: 11/591,142

(22) Filed: Nov. 1, 2006

(65) Prior Publication Data

US 2007/0076104 A1 Apr. 5, 2007

Related U.S. Application Data

(63) Continuation of application No. 09/673,532, filed as application No. PCT/JP00/00950 on Feb. 18, 2000, now Pat. No. 7,573,508.

(30) Foreign Application Priority Data

Feb. 19, 1999 (JP) .................................... 11-041114
Mar. 25, 1999 (JP) .................................... 11-082228
May 31, 1999 (JP) .................................... 11-151859

(51) Int. Cl.
*H04N 5/225* (2006.01)
*H04N 9/64* (2006.01)
*G06K 9/00* (2006.01)

(52) U.S. Cl. ...................... 348/222.1; 348/246; 382/162

(58) Field of Classification Search ............... 348/222.1, 348/224.1, 234, 246, 252, 273; 382/159, 382/160, 165, 190, 195, 224, 238
See application file for complete search history.

(56) References Cited

U.S. PATENT DOCUMENTS

| 3,971,065 | A | 7/1976 | Bayer |
| 5,436,659 | A | 7/1995 | Vincent |
| 5,475,769 | A | 12/1995 | Wober et al. |
| 5,552,827 | A | 9/1996 | Maenaka et al. |
| 5,596,367 | A | 1/1997 | Hamilton, Jr. et al. |
| 5,631,703 | A | 5/1997 | Hamilton et al. |

(Continued)

FOREIGN PATENT DOCUMENTS

EP 0 632 663 1/1995

(Continued)

*Primary Examiner* — Trung Diep
(74) *Attorney, Agent, or Firm* — Frommer Lawrence & Haug LLP; William S. Frommer; Thomas F. Presson

(57) ABSTRACT

An image signal generated by a CCD image sensor is processed by the block-generating section 28 provided in an image-signal processing section 25. A class tap and a prediction tap are thereby extracted. The class tap is output to an ADRC process section 29, and the prediction tap is output to an adaptation process section 31. The ADRC process section 29 performs an ADRC process on the input image signal, generating characteristic data. A classification process section 30 generates a class code corresponding to the characteristic data thus generated and supplies the same to an adaptation process section 31. The adaptation process section 31 reads, from a coefficient memory 32, the set of prediction coefficients which corresponds to the class code. The set of prediction coefficients and the prediction tap are applied, thereby generating all color signals, i.e., R, G and B signals, at the positions of the pixels which are to be processed.

54 Claims, 31 Drawing Sheets

U.S. PATENT DOCUMENTS

| | | | |
|---|---|---|---|
| 5,748,235 A | 5/1998 | Kondo et al. | |
| 5,852,470 A | 12/1998 | Kondo et al. | |
| 5,903,481 A * | 5/1999 | Kondo et al. | 708/313 |
| 5,963,673 A * | 10/1999 | Kodama et al. | 382/239 |
| 5,966,183 A * | 10/1999 | Kondo et al. | 348/458 |
| 6,192,162 B1 | 2/2001 | Hamilton et al. | |
| 6,205,254 B1 * | 3/2001 | Koshi et al. | 382/239 |
| 6,265,714 B1 * | 7/2001 | Shimomura | 250/281 |
| 6,285,714 B1 * | 9/2001 | Kawaguchi et al. | 375/240.21 |
| 6,529,239 B1 | 3/2003 | Dyck et al. | |
| 6,674,903 B1 | 1/2004 | Cliquet | |
| 6,697,107 B1 | 2/2004 | Hamilton et al. | |

FOREIGN PATENT DOCUMENTS

| | | |
|---|---|---|
| EP | 0 731 616 | 9/1996 |
| EP | 0 746 157 | 12/1996 |
| JP | 7-236147 | 9/1995 |
| JP | 10-98695 | 4/1998 |
| JP | 10-164602 | 6/1998 |
| JP | 2000-32402 | 1/2000 |
| WO | WO 96/07275 | 3/1996 |

* cited by examiner

FIG.9A → ADAPTATION PROCESS → FIG.9C

FIG.9D

| G11 | B12 | G13 |
|---|---|---|
| R21 | G22 | R23 |
| G31 | B32 | G33 |

| | | |
|---|---|---|
| G11: -0.18302658 | B21: -0.00348441 | G13: -0.18293385 |
| R12: 0.49879314 | G22: 0.73624461 | R23: 0.50594424 |
| G13: -0.18439429 | B23: -0.00852019 | G33: -0.19665975 |

FIG.10A   FIG.10B

| G11 | R12 | G13 |
|---|---|---|
| B21 | G22 | B23 |
| G31 | R32 | G33 |

| | | |
|---|---|---|
| G11: -0.18229898 | R12: 0.60459112 | G13: -0.20230164 |
| B12: -0.00918055 | G22: 0.76466298 | B23: 0.01345021 |
| G13: -0.19371885 | R23: 0.50304269 | G33: -0.19657899 |

FIG.11A   FIG.11B

| R11 | G12 | R13 |
|---|---|---|
| G21 | B22 | G23 |
| R31 | G32 | R33 |

| | | |
|---|---|---|
| R11: -0.18302658 | G12: -0.00348441 | R13: 0.24498040 |
| G12: 0.49879314 | B22: 0.73624461 | G23: 0.03039153 |
| R13: -0.18439429 | G23: -0.00852019 | R33: 0.25799207 |

FIG.12A   FIG.12B

PIXEL OF INTEREST

| G | R | G | R |
|---|---|---|---|
| B | G | B | G |
| G | R | G | R |
| B | G | B | G |

FIG.20A

| G | R | G | B |
|---|---|---|---|
| R | G | B | G |
| G | R | G | B |
| R | G | B | G |

FIG.20B

| G | R | G | R |
|---|---|---|---|
| G | B | G | B |
| G | R | G | R |
| G | B | G | B |

FIG.20C

| G | R | G | B |
|---|---|---|---|
| G | B | G | R |
| G | R | G | B |
| G | B | G | R |

FIG.20D

| G | R | B | G |
|---|---|---|---|
| G | R | B | G |
| G | R | B | G |
| G | R | B | G |

FIG.20E

| G | R | B | G |
|---|---|---|---|
| R | B | G | R |
| B | G | R | B |
| G | R | B | G |

FIG.20F

| G | B | G | B |
|---|---|---|---|
| G | R | G | R |
| G | B | G | B |
| R | G | R | G |

FIG.20G

| M | G | M | G |
|---|---|---|---|
| C | Y | C | Y |
| M | G | M | G |
| Y | C | Y | C |

FIG.20H

| YM | CG | YM | CG |
|----|----|----|----|
| YG | CM | YG | CM |
| YM | CG | YM | CG |
| YG | CM | YG | CM |

FIG.20 I

| W | C | G | Y |
|---|---|---|---|
| G | Y | W | C |
| W | C | G | Y |
| G | Y | W | C |

FIG.20J

| W | G | W | G |
|---|---|---|---|
| C | Y | C | Y |
| W | G | W | G |
| C | Y | C | Y |

FIG.20K

| W | G | W | G |
|---|---|---|---|
| C | Y | C | Y |
| W | G | W | G |
| C | Y | C | Y |

FIG.20L

| G | C | G | C |
|---|---|---|---|
| G | Y | G | Y |
| G | C | G | C |
| Y | G | Y | G |

FIG.20M

| Y | G | C | Y |
|---|---|---|---|
| Y | G | C | Y |
| Y | G | C | Y |
| Y | G | C | Y |

FIG.20N

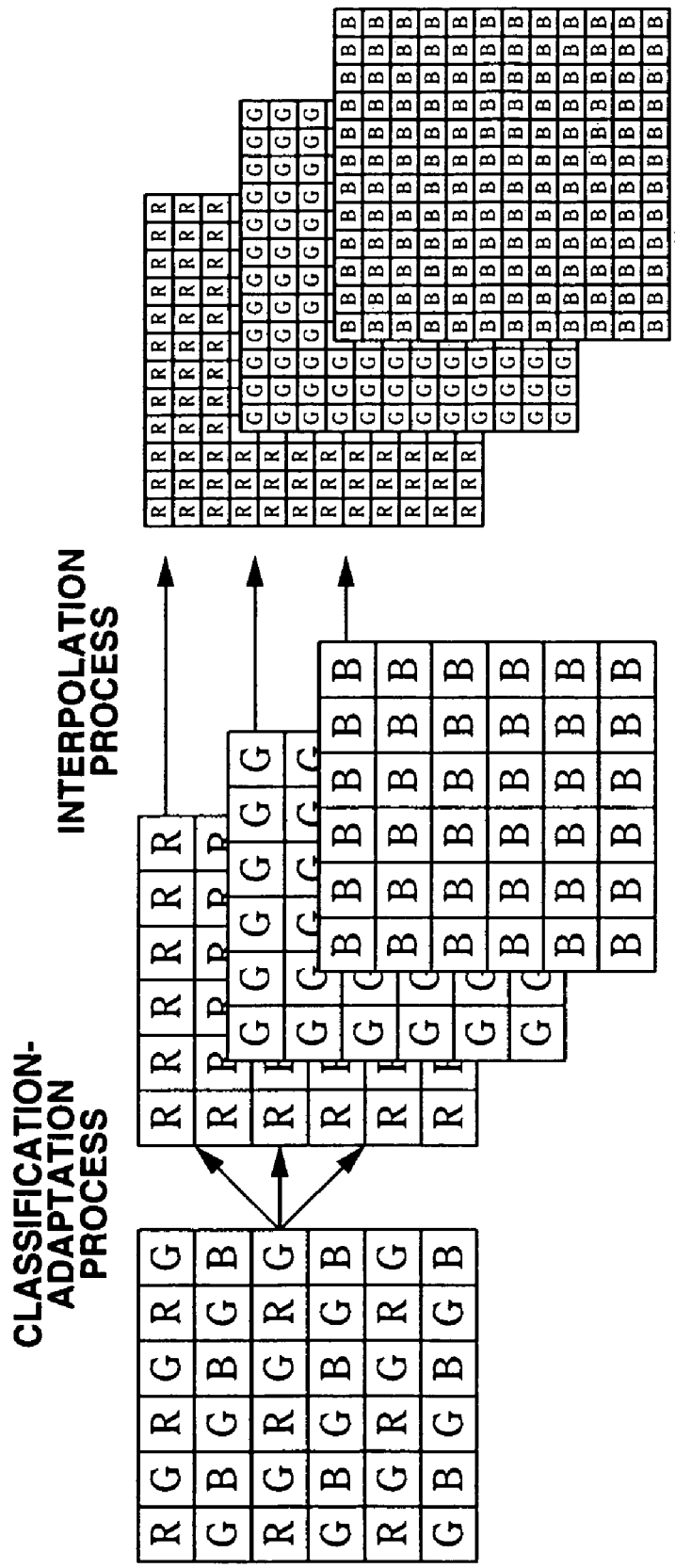

FIG.22A  FIG.22B

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

FIG.40C ated on each R pixel
IMAGE SIGNAL PROCESSING APPARATUS, AND IMAGE SIGNAL PROCESSING METHOD

CROSS-REFERENCE TO RELATED APPLICATIONS

This is a continuation of application Ser. No. 09/673,532 filed Nov. 27, 2000 now U.S. Pat. No. 7,573,508, filed under 35 U.S.C. §371, as the national phase of International Application PCT/JP00/00950 filed Feb. 18, 2000, having a claim of priority to Japanese Applications 11-041114, filed in Japan on Feb. 19, 1999, 11-082228, filed in Japan on Mar. 25, 1999, and 11-151859, filed in Japan on May 31, 1999, the entirety of which are incorporated herein by reference.

TECHNICAL FIELD

The present invention relates to an image-signal processing apparatus, an image-signal processing method, a learning apparatus, a learning method, and a recording medium. More particularly, the invention relates to an image-signal processing apparatus, image-signal processing method, learning apparatus, a learning method and recording medium in which the color components of a pixel represented by an image signal are interpolated by means of classification-adaptation process so that the pixel may have a red (R) component, a green (G) component and a blue (B) component.

BACKGROUND ART

There are two types of imaging apparatuses that have a solid-state image sensor such as a CCD (Charge Coupled Device) image sensor. The first type has one CCD image sensor (hereinafter, referred to as "single-plate camera"). The second type has three CCD image sensors (hereinafter, referred to as "three-plate camera").

In a three-plate camera, the three CCD image sensors for generating an R signal, a G signal and a B signal, for example, generate three primary-color signals, respectively. The three primary-color signals are processed, whereby a color image signal is generated. The color image signal is recorded in a recording medium.

In a single-plate camera, the CCD image sensor is arranged in front of a color-coding filter that comprises a color-filter array composed of color filters, each allocated to one pixel. The color-coding filter generates color-coded, color component signals, each for one pixel. The color-filter array, which constitutes the color-coding filter, includes primary-color filters such as a R (Red) array, a G (Green) array and a B (Blue) array and complementary-color filters such as a Ye (Yellow) array, a Cy (Cyanogen) array and an Mg (Magenta) array. In the single-plate camera, the CCD image sensor generates a signal representing one color for one pixel, and another signal representing another color is generated for the pixel by means of linear interpolation, thereby providing an image that is similar to the image the three-plate camera provides. The single-plate camera is incorporated in a video camera or the like, which should be small and light.

The CCD image sensor provided in a single-plate camera may be arranged in front of a color-coding filter that comprises a color-filter array of such color arrangement as is shown in FIG. 1A. Each pixel of CCD image sensor, arranged at the back of a color filter, outputs only an image signal that corresponds to the primary color R, G or B, of that color filter. That is, a pixel positioned at the back of an R filter outputs an R-component image signal, but cannot output a G-component image signal or a B-component image signal. Likewise, a G-component pixel outputs only a G-component image signal, but cannot output an R-component image signal or a B-component image signal. A B-component pixel outputs only a B-component image signal, but cannot output an R-component image signal or a G-component image signal.

The color arrangement of the color-filter array, which is shown in FIG. 1A, is called "Bayer arrangement." In this case, G-color filters are arranged in the pattern of a chessboard, and R-color filters and B-color filters are arranged in alternate columns, each in a vacant square.

An R-component signal, a G-component signal and a B-component signal must be processed for each pixel in the next-stage section. To process these signals, interpolation has hitherto been performed on the outputs from a CCD image sensor having n.times.m pixels (n and m are positive integers). Thus, n.times.m R-pixel image signals and n.times.m G-pixel image signals are generated as is illustrated in FIG. 1B. That is, image signals equivalent to those CCD outputs of a three-plate camera are output to the next-stage section.

To generate image signals in, for example, density four times as high, interpolation is performed, generating 2n.times.2m R-pixel image signals from the n.times.m R-pixel image signals, 2n.times.2m G-pixel image signals from the n.times.m G-pixel image signals, and 2n.times.2m B-pixel image signals from the n.times.m B-pixel image signals.

In the above-described single-lens camera, however, a linear process is carried out to interpolate color signals. The waveform of the image is inevitably deformed, rendering the image unclear as a whole. A process such as edge emphasis must therefore be performed to increase the apparent resolution of the image. Since the image resolution achieved by the image signals output from the single-plate camera is lower than the image resolution attained by the outputs of a three-plate camera, the resultant image is blurred as a whole due to the influence of the linear process.

The three primary-color components of each pixel, which have the same resolution, may be generated from an output of the CCD image sensor of the single-plate camera, thus obtaining image signals. Image signals may then be obtained in a higher density from the image signals thus generated, thereby to increase the pixel density. This method, however, cannot provide a sufficient precision.

It is proposed that the classification-adaptation process, i.e., a process other than linear interpolation, be performed on the CCD outputs of the single-lens camera, for each of the R, G and B primary-color image signals, thereby to generate image signals that are equivalent to the CCD outputs of a three-plate camera. (See Japanese Patent Application No. 8-508623.) However, when the classification-adaptation process is effected on the R, G and B primary-color image signals independently, the same process is performed on each R pixel and each B pixel as on each G pixel (two existing in very four pixels), though only one R pixel exists in very four pixels and only one B pixel exists in very four pixels in the m.times.n pixels as shown in FIGS. 1A and 1B in the case where a color-filter array of Bayer arrangement is used. Consequently, high-precision prediction cannot be accomplished as far as the R-component signals and B-component image signals are concerned.

DISCLOSURE OF THE INVENTION

Accordingly, an object of the present invention is to provide an image-signal processing apparatus, an image-signal processing method, a learning apparatus, a learning method, and a recording medium, which enables single-plate cameras to generate image signals comparable with those generated as image outputs by three-plate cameras, by performing a classification-adaptation process to predict color signals.

Another object of the invention is to provide an image-signal processing apparatus, an image-signal processing method, a learning apparatus, a learning method, and a recording medium, which can reliably generate high-definition image signals.

Still another object of this invention is to provide an image-signal processing apparatus, an image-signal processing method, a learning apparatus, a learning method, and a recording medium, which can predict color signals with high accuracy, thereby generating image signals of high resolution.

According to the invention, there is provided, an image-signal processing apparatus for processing an input image signal, said input image signal having any one of various color components at a position of each pixel. The apparatus comprises: extraction means for extracting, for each pixel of interest of the input image signal, a plurality of pixels located near each pixel of interest; class-determining means for determining a class from the pixels extracted by the extraction means; and pixel-generating means for generating a pixel at a position of the pixel of interest in accordance with the class determined by the class-determining means, said pixel having a color component different from at least the color component of the pixel of interest.

According to this invention, there is provided an image-signal processing method of processing an input image signal, said input image signal having any one of various color components at a position of a pixel. The method comprises: an extraction step of extracting, for each pixel of interest of the input image signal, a plurality of pixels located near each pixel of interest; a class-determining step of determining a class from the pixels extracted in the extraction step; and a pixel-generating step of generating a pixel at a position of the pixel of interest in accordance with the class determined in the class-determining step, said pixel having a color component different from at least the color component of the pixel of interest.

According to the present invention, there is provided a recording medium storing a computer program designed to process an input image signal, said input image signal having any one of various color components at a position of a pixel. The computer program comprising: an extraction step of extracting a plurality of pixels located near each pixel of interest of the input image signal; a class-determining step of determining a class from the pixels extracted in the extraction step; and a pixel-generating step of generating a pixel at a position of the pixel of interest in accordance with the class determined in the class-determining step, said pixel having a color component different from at least the color component of the pixel of interest.

According to this invention, there is provided a learning apparatus which comprises: first pixel-extracting means for extracting a plurality of pixels located near each pixel of interest of a student-image signal which has one color component at respective position of pixel; class-determining means for determining a class from the pixels extracted by the first pixel-extracting means; second pixel-extracting means for extracting a plurality of pixels located near positions corresponding to the position of the pixel of interest of the student-image signal, from a teacher-image signal which corresponds to the student-image signal and which have a plurality of color components for each pixel; and prediction-coefficient generating means for generating a set of prediction coefficients for each class, for use in generating an image signal corresponding to the teacher-image signal from an image signal corresponding to the student-image signal, in accordance with values of the pixels extracted by the first pixel-extracting means and second pixel-extracting means.

According to the invention, there is provide a learning method which comprises: a first pixel-extracting step of extracting a plurality of pixels located near each pixel of interest of a student-image signal which has one color component at respective position of pixel; a class-determining step of determining a class from the pixels extracted in the first pixel-extracting step; a second pixel-extracting step of extracting a plurality of pixels located near positions corresponding to the position of the pixel of interest of the student-image signal, from a teacher-image signal which corresponds to the student-image signal and which have a plurality of color components for each pixel; and a prediction-coefficient generating step of generating a set of prediction coefficients for each class, for use in generating an image signal corresponding to the teacher-image signal from an image signal corresponding to the student-image signal, in accordance with values of the pixels extracted in the first pixel-extracting step and second pixel-extracting step.

According to this invention, there is provided a recording medium storing a computer program designed to perform a learning process to generate a set of prediction coefficients corresponding to a class. The program comprises: a first pixel-extracting step of extracting a plurality of pixels located near each pixel of interest of a student-image signal which has one color component at respective position of pixel, a class-determining step of determining a class from the pixels extracted in the first pixel-extracting step; a second pixel-extracting step of extracting a plurality of pixels located near positions corresponding to the position of the pixel of interest of the student-image signal, from a teacher-image signal which corresponds to the student-image signal and which have a plurality of color components for each pixel; and a prediction-coefficient generating step of generating a set of prediction coefficients for each class, for use in generating an image signal corresponding to the teacher-image signal from an image signal corresponding to the student-image signal, in accordance with values of the pixels extracted in the first pixel-extracting step and second pixel-extracting step.

According to the invention, there is provided an image-signal processing apparatus for processing an input image signal, said input image signal having a prescribed number of sample values which constitute one image and each of which represents any one of various colors at each pixel. The apparatus comprises: extraction means for extracting, for each pixel of interest of the input signal, a plurality of pixels located near each pixel of interest; class-determining means for determining a class from the pixels extracted by the extraction means; and output image-signal generating means for generating an output image signal having more sample values than the prescribed number, for the various colors, by processing each pixel of the input image signal in accordance with the class determined by the class-determining means.

According to the present invention, there is provided an image-signal processing method of processing an input image signal, said input image signal having a prescribed number of sample values which constitute one image and each of which represents any one of various colors. The method comprises: an extraction step of extracting, for each pixel of interest of the input image signal, a plurality of pixels located near each pixel of interest; a class-determining step of determining a class from the pixels extracted in the extraction step; and an output image-signal generating step of generating an output image signal having more sample values than the prescribed number, for the various colors, by processing each pixel of the input image signal in accordance with the class determined in the class-determining step.

According to the invention, there is provided a recording medium storing a computer program designed to process an input image signal, said input image signal having a prescribed number of sample values which constitute one image and each of which represents any one of various colors. The computer program comprises: an extraction step of extracting, for each pixel of interest of the input image signal, a plurality of pixels located near each pixel of interest; a class-determining step of determining a class from the pixels extracted in the extraction step; and an output image-signal generating step of generating an output image signal having more sample values than the prescribed number, for the various colors, by processing each pixel of the input image signal in accordance with the class determined in the class-determining step.

According to the present invention, there is provided a learning apparatus which comprises: first pixel-extracting means for extracting a plurality of pixels located near each pixel of interest from a student-image signal having a prescribed number of sample values which constitute one image and each of which represents any one of various colors at a position of a pixel, said pixel of interest being one included in an image to be predicted, which has more sample values than the prescribed number; class-determining means for determining a class from the pixels extracted by the first pixel-extracting means; second pixel-extracting means for extracting a plurality of pixels located near positions corresponding to the position of the pixel of interest, from a teacher-image signal which corresponds to the image signal to be predicted and which have a plurality of color components for each pixel; and prediction-coefficient generating means for generating a set of prediction coefficients for each class, for use in a prediction process for generating an image signal corresponding to the teacher-image signal, from an image signal that corresponds to the student-image signal, in accordance with values of the pixels extracted by the first pixel-extracting means and second pixel-extracting means.

According to the invention, there is provided a learning method which comprises: a first pixel-extracting step of extracting a plurality of pixels located near each pixel of interest, from a student-image signal having a prescribed number of sample values which constitute one image and each of which represents any one of various colors at a position of a pixel, said pixel of interest being one included in an image to be predicted, which has more sample values than the prescribed number; a class-determining step of determining a class from the pixels extracted in the first pixel-extracting step; a second pixel-extracting step of extracting a plurality of pixels located near positions corresponding to the position of the pixel of interest, from a teacher-image signal which corresponds to the image signal to be predicted and which have a plurality of color components for each pixel; and a prediction-coefficient generating step of generating a set of prediction coefficients for each class, for use in a prediction process for generating an image signal corresponding to the teacher-image signal, from an image signal that corresponds to the student-image signal, in accordance with values of the pixels extracted in the first pixel-extracting step and second pixel-extracting step.

According to the invention, there is provided a recording medium storing a computer program designed to perform a learning process in accordance with a class. The computer program comprises: a first pixel-extracting step of extracting a plurality of pixels located near each pixel of interest, from a student-image signal having a prescribed number of sample values which constitute one image and each of which represents any one of various colors at a position of a pixel, said pixel of interest being one included in an image to be predicted, which has more sample values than the prescribed number; a class-determining step of determining a class from the pixels extracted in the first pixel-extracting step; a second pixel-extracting step of extracting a plurality of pixels located near positions corresponding to the position of the pixel of interest, from a teacher-image signal which corresponds to the image signal to be predicted and which have a plurality of color components for each pixel; and a prediction-coefficient generating step of generating a set of prediction coefficients for each class, for use in a prediction process for generating an image signal corresponding to the teacher-image signal, from an image signal that corresponds to the student-image signal, in accordance with values of the pixels extracted in the first pixel-extracting step and second pixel-extracting step.

According to the present invention, there is provided an image-signal processing apparatus for processing an input image signal, said input image signal having any one of various color components at a position of each pixel. This apparatus comprises: extraction means for extracting, for each pixel of interest of the input image signal, a plurality of pixels located near each pixel of interest, each said plurality of pixels having a color component of the highest density of all color components; class-determining means for determining a class from the pixels extracted by the extraction means; and pixel-generating means for generating a pixel in accordance with the class determined by the class-determining means, said pixel having a color component different from at least the color component of the pixel of interest.

According to this invention, there is provided an image-signal processing method of processing an input image signal, said input image signal having any one of various color components at a position of each pixel. The method comprises: an extraction step of extracting, for each pixel of the interest of the input image signal, a plurality of pixels located near each pixel of interest, each said plurality of pixels having a color component of the highest density of all color components; a class-determining step of determining a class from the pixels extracted in the extraction step; and a pixel-generating step of generating a pixel in accordance with the class determined in the class-determining step, said pixel having a color component different from at least the color component of the pixel of interest.

According to the invention, there is provided a recording medium storing a computer program designed to process an input image signal, said input image signal having any one of various color components at a position of each pixel. The computer program comprises: an extraction step of extracting, for each pixel of interest of the input image signal, a plurality of pixels located near each pixel of interest, each said plurality of pixels having a color component of the highest density of all color components; a class-determining step of determining a class from the pixels extracted in the extraction step; and a pixel-generating step of generating a pixel in accordance with the class determined in the class-determining step, said pixel having a color component different from at least the color component of the pixel of interest.

According to this invention, there is provided a learning apparatus which comprises: first pixel-extracting means for extracting a plurality of pixels located near each pixel of interest of a student-image signal which has any one of various color components at a position of each pixel, each said plurality of pixels having a color component of the highest density of all color components; class-determining means for determining a class from the pixels extracted by the first pixel-extracting means; second pixel-extracting means for extracting a plurality of pixels located near positions corresponding to the position of the pixel of interest of the student-image signal, from a teacher-image signal which corresponds to the student-image signal and which have a plurality of color components for each pixel; and prediction-coefficient generating means for generating a set of prediction coefficients for each class, for use in generating an image signal corresponding to the teacher-image signal from an image signal corresponding to the student-image signal, in accordance with values of the pixels extracted by the first pixel-extracting means and second pixel-extracting means.

According to the present invention, there is provided a learning method which comprises: a first pixel-extracting step of extracting a plurality of pixels located near each pixel of interest of a student-image signal which has any one of various color components at a position of each pixel, each said plurality of pixels having a color component of the highest density of all color components; a class-determining step of determining a class from the pixels extracted in the first pixel-extracting step; a second pixel-extracting step of extracting a plurality of pixels located near positions corresponding to the position of the pixel of interest of the student-image signal, from a teacher-image signal which corresponds to the student-image signal and which have a plurality of color components for each pixel; and a prediction-coefficient generating step of generating a set of prediction coefficients for each class, for use in generating an image signal corresponding to the teacher-image signal from an image signal corresponding to the student-image signal, in accordance with values of the pixels extracted in the first pixel-extracting means and second pixel-extracting step.

According to this invention, there is provided a recording medium storing a computer program designed to perform a learning process in accordance with a class. The computer program comprises: a first pixel-extracting step of extracting a plurality of pixels located near each pixel of interest of a student-image signal which has any one of various color components at a position of each pixel, each said plurality of pixels having a color component of the highest density of all color components; a class-determining step of determining a class from the pixels extracted in the first pixel-extracting step; a second pixel-extracting step of extracting a plurality of pixels located near positions corresponding to the position of the pixel of interest of the student-image signal, from a teacher-image signal which corresponds to the student-image signal and which have a plurality of color components for each pixel; and a prediction-coefficient generating step of generating a set of prediction coefficients for each class, for use in generating an image signal corresponding to the teacher-image signal from an image signal corresponding to the student-image signal, in accordance with values of the pixels extracted in the first pixel-extracting means and second pixel-extracting step.

According to the invention, there is provided an image-signal processing apparatus for processing an input image signal, said input image signal having any one of various color components at a position of each pixel. The apparatus comprises: extraction means for extracting, for each pixel of interest of the input image signal, a plurality of pixels for each color component, from pixels located near each pixel of interest; class-determining means including a characteristic-data generating section for generating characteristic data about the pixels of each color component, from the pixels of each color component which have been extracted by the extraction means, and a class-determining section for determining a class from the characteristic data generated for each color component; and pixel-generating means for generating a pixel in accordance with the class determined by the class-determining means, said pixel having a color component different from at least the color component of the pixel of interest.

According to this invention, there is provided an image-signal processing method of processing an input image signal, said input image signal having any one of various color components at a position of each pixel. The apparatus comprises: an extraction step of extracting, for each pixel of interest of the input image signal, a plurality of pixels for each color component, from pixels located near each pixel of interest; a class-determining step of generating characteristic data about the pixels of each color component, from the pixels of each color component which have been extracted in the extraction step and determining a class from the characteristic data generated for each color component; and a pixel-generating step of generating a pixel in accordance with the class determined in the class-determining step, said pixel having a color component different from at least the color component of the pixel of interest.

According to the invention, there is provided a recording medium storing a computer program designed to process an input image signal, said input image signal having any one of various color components at a position of each pixel. The computer program comprises: an extraction step of extracting, for each pixel of interest of the input image signal, a plurality of pixels for each color component, from pixels located near each pixel of interest; a class-determining step of generating characteristic data about the pixels of each color component, from the pixels of each color component which have been extracted in the extraction step and determining a class from the characteristic data generated for each color component; and a pixel-generating step of generating a pixel in accordance with the class determined in the class-determining step, said pixel having a color component different from at least the color component of the pixel of interest.

According to the present invention, there is provided a learning apparatus which comprises: first pixel-extracting means for extracting a plurality of pixels for each color component, from pixels located near each pixel of interest of a student-image signal having one color component at respective position of pixel; class-determining means for generating characteristic data about the pixels of each color component, from the pixels of each color component which have been extracted by the first pixel-extracting means and for determining a class from the characteristic data generated for each color component; second pixel-extracting means for extracting a plurality of pixels located near positions corresponding to the position of the pixel of interest of the student-image signal, from a teacher-image signal which corresponds to the student-image signal and which have a plurality of color components for each pixel; and prediction-coefficient generating means for generating a set of prediction coefficients for each class, for use in generating an image signal corresponding to the teacher-image signal from an image signal corresponding to the student-image signal, in accordance with values of the pixels extracted by the first pixel-extracting means and second pixel-extracting means.

According to this invention, there is provided a learning method which comprises: a first pixel-extracting step of extracting a plurality of pixels for each color component, from pixels located near each pixel of interest of a student-image signal having one color component at respective position of pixel; a class-determining step of generating characteristic data about the pixels of each color component, from the pixels of each color component which have been extracted in the first pixel-extracting step and for determining a class from the characteristic data generated for each color component; a second pixel-extracting step of extracting a plurality of pixels located near positions corresponding to the position of the pixel of interest of the student-image signal, from a teacher-image signal which corresponds to the student-image signal and which have a plurality of color components for each pixel; and a prediction-coefficient generating step of generating a set of prediction coefficients for each class, for use in generating an image signal corresponding to the teacher-image signal from an image signal corresponding to the student-image signal, in accordance with values of the pixels extracted in the first pixel-extracting step and second pixel-extracting step.

According to the present invention, there is provided a recording medium storing a computer program designed to perform a learning process in accordance with a class. The computer program comprises: a first pixel-extracting step of extracting a plurality of pixels for each color component, from pixels located near each pixel of interest of a student-image signal having one color component at respective position of pixel; a class-determining step of generating characteristic data about the pixels of each color component, from the pixels of each color component which have been extracted in the first pixel-extracting step and for determining a class from the characteristic data generated for each color component; a second pixel-extracting step of extracting a plurality of pixels located near positions corresponding to the position of the pixel of interest of the student-image signal, from a teacher-image signal which corresponds to the student-image signal and which have a plurality of color components for each pixel; and a prediction-coefficient generating step of generating a set of prediction coefficients for each class, for use in generating an image signal corresponding to the teacher-image signal from an image signal corresponding to the student-image signal, in accordance with values of the pixels extracted in the first pixel-extracting step and second pixel-extracting step.

BRIEF DESCRIPTION OF THE DRAWINGS

FIG. 8 is a schematic representation of the structure of a prediction tap;

FIGS. 9A, 9B, 9C and 9D are diagrams illustrating how the image signal processing section performs the classification-adaptation process, thereby to process image signals;

FIGS. 10A and 10B are diagrams showing a set of prediction coefficients;

FIGS. 11A and 11B are diagrams illustrating another set of prediction coefficients;

FIGS. 12A and 12B are diagrams showing another set of prediction coefficients;

FIGS. 16A, 16B and 16C are diagrams depicting class taps;

FIGS. 17A, 17B and 17C are diagrams showing class taps;

FIGS. 18A, 18B and 18C are diagrams illustrating class taps;

FIGS. 19A, 19B and 19C are diagrams showing class taps;

FIGS. 20A to 20N are schematic representations of various color-filter arrays, each comprising color-coding filters, which may be used in the CCD image sensor incorporated in the digital still camera;

FIGS. 21A, 21B and 21C are diagrams illustrating another type of image signal processing the image signal processing section may perform;

FIGS. 22A and 22B are diagrams showing still another of image signal processing the image signal processing section may perform;

FIG. 23 is a diagram showing a class tap;

FIG. 24 is a diagram showing another type of a class tap;

FIG. 25 is a diagram depicting still another type of a class tap;

FIG. 26 is a diagram showing another type of a class tap;

FIG. 27 is a diagram illustrating a prediction tap;

FIG. 28 is a diagram showing another type of a prediction tap;

FIG. 29 is a diagram depicting another type of a prediction tap;

FIG. 30 is a diagram illustrating a different type of a prediction tap;

FIG. 31 is a diagram showing a pixel predicted;

FIG. 32 is a diagram schematically showing a class tap that corresponds to the pixel shown in FIG. 31;

FIG. 33 is a diagram illustrating a prediction tap that corresponds to the pixel shown in FIG. 31;

FIG. 34 is a diagram showing a pixel predicted;

FIG. 35 is a diagram schematically showing a class tap that corresponds to the pixel shown in FIG. 34;

FIG. 36 is a diagram illustrating a prediction tap that corresponds to the pixel shown in FIG. 34;

FIG. 37 is a diagram showing a pixel predicted;

FIGS. 38A and 38B are diagrams schematically showing class taps that correspond to the pixel shown in FIG. 37;

FIGS. 39A and 39B are diagrams schematically showing class taps that correspond to the pixel shown in FIG. 37;

FIGS. 40A, 40B and 40C illustrate a tap of another type;

BEST MODE FOR CARRYING OUT THE INVENTION

The best mode for carrying out the present invention will be described in detail, with reference to the accompanying drawings.

Figure 2:
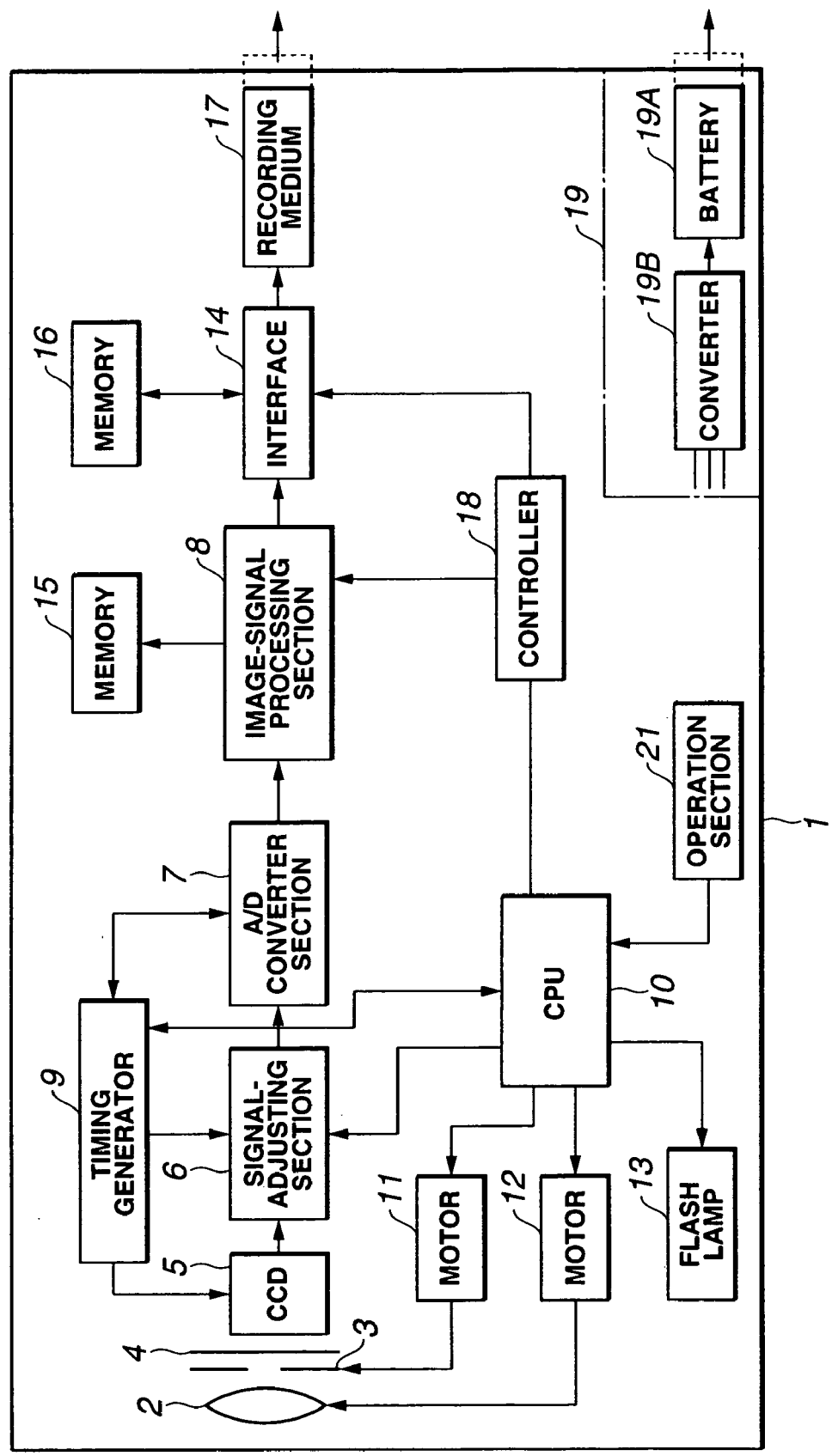
FIG. 2 is a block diagram showing the structure of a digital still camera to which the present invention is applied.

The present invention is applied to, for example, a digital still camera 1 of the type shown in FIG. 2. The digital still camera 1 is a single-plate camera designed to taking color pictures. The camera 1 comprises a color-coding filter 4 and one CCD image sensor 5. The color-coding filter 4 is arranged in front of the CCD image sensor 5 and composed of color filers, each provided for one pixel. A lens 2 focuses the light reflected from a picked image. The light is applied to the CCD image sensor 5 through an iris 3 and the color-coding filter 4. An image of the object is thereby formed on the image-forming surface of the CCD image sensor 5. The color-coding filter 4 and the CCD image sensor 5 are components separated from each other in the digital still camera 1. Nonetheless, they may be combined into one unit.

The CCD image sensor 5 receives light for a time determined by the operation of the shutter that is controlled by a timing signal supplied from a timing generator 9. The sensor 5 generates a signal charge (analog value) for each pixel, which corresponds to the amount of light that has passed through the color-coding filter 4. An image signal representing the image of the object, which the light incident to the sensor 4 has formed, is thereby generated. The image signal is supplied, as image output, to a signal-adjusting section 6.

The signal-adjusting section 6 comprises an AGC (Automatic Gain Control) circuit and a CDS (Correlated Double Sampling) circuit. The AGC circuit adjusts the gain to set the image signal at a constant level. The CDS circuit removes the 1/f noise made by the CCD image sensor 5.

The image signal output from the signal-adjusting section 6 is supplied to an A/D converter section 7, which converts the image signal to a digital signal. The digital signal is supplied to an image-signal processing section 8. The A/D converter section 7 generates a digital image signal in accordance with a timing signal supplied from the timing generator 9. The digital image signal has, for example, 10 bits for each sample.

In the digital still camera 1, the timing generator 9 supplies various timing signals to the CCD image sensor 5, signal-adjusting section 6, A/D converter section 7 and CPU 10. The CPU 10 drives a motor 11, controlling the iris 3. The CPU 10 drives a motor 12, moving the lens 2 and the like, performing controls such as zooming and focusing. Further, the CPU 10 controls a flash lamp 13, whenever necessary, to apply flashing light to the object.

The processing section 8 performs defect-eliminating process, digital clamping process, white-balance adjusting process, gamma-correcting process, prediction process using classification adaptation, and the like, on the image signal supplied from the A/D converter section 7.

A memory 15 is connected to the image signal-processing section 8. The memory 15 is, for example, a RAM (Random Access Memory) and provided for storing signals that are necessary for the section 8 to process the image signal. The image signal processed by the image-signal processing section 8 is stored via an interface 14 into a memory 16. The image signal is supplied from the memory 16 via the interface 14 and recorded in a recording medium 17 that can be removably inserted in the digital still camera 1, The motor 11 drives the iris 3 in accordance with the control data supplied from the CPU 10. Thus driven, the iris 3 controls the amount of incident light passing through the lens 2. The motor 12 moves the lens 2 toward and away from the CCD image sensor 2 in accordance with the control data supplied from the CPU 10, whereby the focusing condition is controlled. Automatic iris control, automatic focusing control and the like can thereby accomplished. The flash lamp 13 emits flashing light to the object in a predetermined amount, under the control of the CPU 10.

The interface 14 supplies the image signal output from the image-signal processing section 8, into the memory 16 if necessary. The interface 14 also effects interface process on the image signal and then supplies the signal to the recording medium 17 so that the signal may be recorded in the medium 17. The recording medium 17 is one that can be removably set in the main body of the digital still camera 1. It may be a floppy disk, a disk-shaped recording medium for use in hard disk drives, a flash memory such as a memory card, or the like.

A controller 18 is provided, which is controlled by the CPU 10 to supply control data to the image-signal processing section 8 and the interface 14, thereby controlling the section 8 and the interface 14. To the CPU 10 there are input operation data generated as the user operates an operation section 20 that has buttons including a shutter button and a zoom button. In accordance with the operation data, the CPU 10 controls the above-mentioned other components of the camera 1. The camera 1 has a power supply section 19, which comprises a battery 19A and a DC/DC converter 19B. The DC/DC converter 19B converts the power supplied from the battery 19A, to a direct current of a predetermined value, which is supplied to the various components of the camera 1. The battery 19A, which is a rechargeable one, is removably set in the main body of the digital still camera 1.

Figure 3:
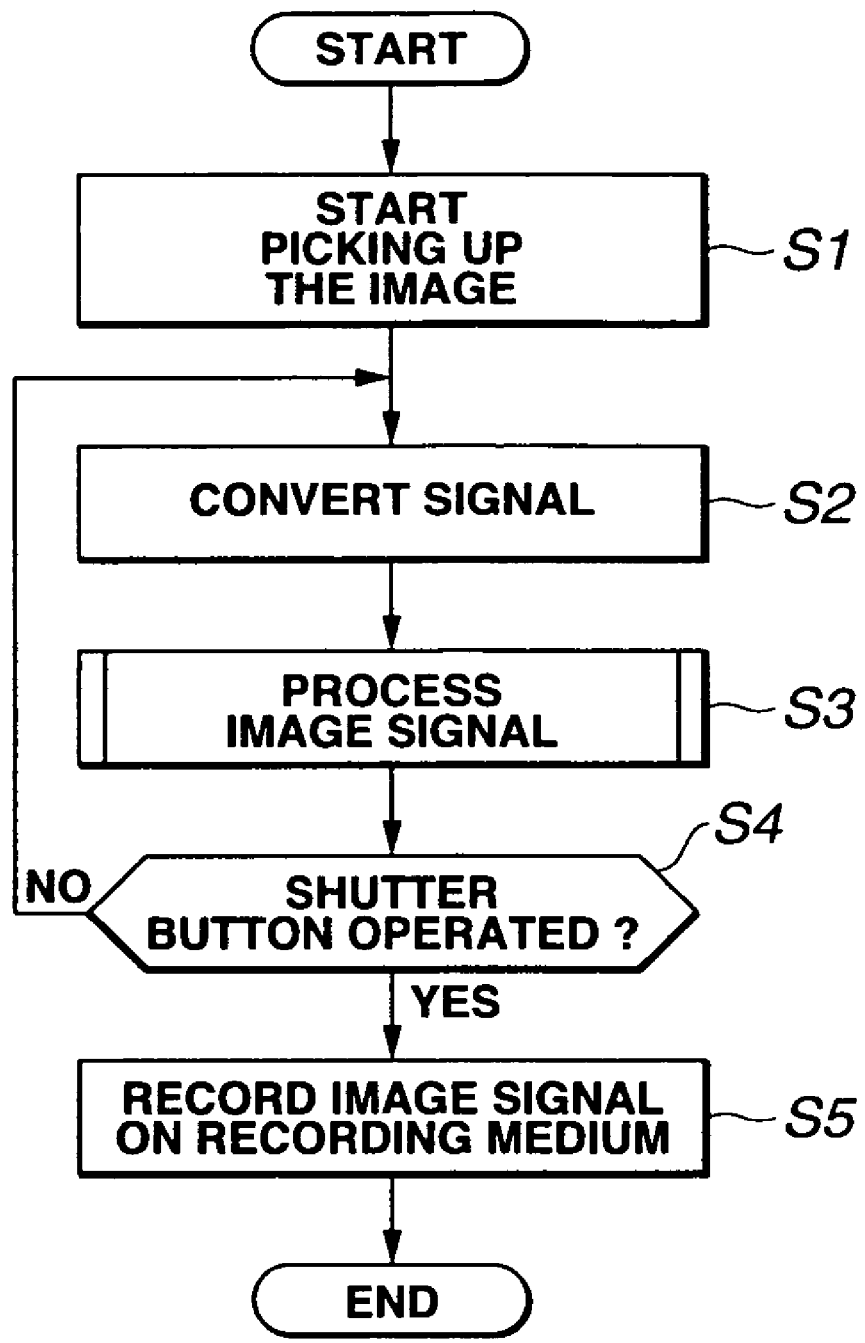
FIG. 3 is a flowchart for explaining how the digital still camera operates.

How the digital still camera 1 shown in FIG. 2 operates will be described, with reference to the flowchart of FIG. 3. The digital still camera 1 starts picking the image in Step S1 when the power switch is turned on. More precisely, the CPU 10 drives the motor 11 and the motor 12, achieving the focusing and adjusting the iris 3. The light reflected from the object is applied through the lens 2, forming an image of the object on the CCD image sensor 5.

In Step S2, the signal-adjusting section 6 adjusts the gain of the image signal generated by the CCD image sensor 5 and representing the image formed on the sensor 5, thereby setting the gain at the constant level. Further, the section 6 removes the noise from the image signal. The A/D converter section 7 converts the image signal to a digital signal.

In Step S3, the image-signal processing section 8 performs processes, including classification-adaptation process, on the digital image signal generated by the A/D converter section 7.

The user can review the picked image since the image represented by the signal output from the CCD image sensor 5 is displayed in a view finder. The image of the object may be reviewed by the user through an optical view finder.

If the user wants to record the image of the object he or she has reviewed through the view finder, he or she operates the shutter button provided on the operation section 20. In Step S4, the CPU 10 of the digital still camera determines whether the shutter button has been operated. The digital camera 1 repeats Steps S2 and S3 until the CPU 10 determines that the shutter button has been operated. When the CPU 10 determines that the shutter button has been operated, the operation goes to Step S5.

In Step S5, the image signal, which the image-signal processing section 8 has processed, is supplied via the interface 14 to the recording medium 17. The image signal is thereby recorded in the recording medium 17.

The image-signal processing section 8 will be described, with reference to FIG. 4.

The image-signal processing section 8 has a defect correcting section 21, which receives the digital image signal from the A/D converter section 7. The image signal may contain pixel signals generated from those pixels of the CCD image sensor 5 which do not react to the incident light or which always hold electric charges. The defect correcting section 21 detects such pixel signals, or defective pixel signals, and processes the image signal to prevent the defective pixel signals from adversely influencing the quality of the image signal.

In the A/D converter section 7, the value of input analog signal is shifted to the positive-value side in order not to cut the negative value, and the analog signal is converted to a digital signal. A clamping section 22 clamps the image signal the defect correcting section 21 has corrected, thereby eliminating the shifted component of the image signal.

The image signal clamped by the clamping section 22 is supplied to a white-balancing section 23. The white-balancing section 23 corrects the gain of the image signal supplied from the clamping section 22, thus adjusting the white balance of the image signal. The image signal having its white balance adjusted is supplied to a gamma-correcting section 24. The gamma-correcting section 24 corrects the level of the image signal whose white balance has been corrected by the white-balance correcting section 23, in accordance with a gamma curve. The image signal, thus gamma-corrected, is supplied to a prediction-process section 25.

The prediction-process section 25 carries out a classification-adaptation process, converting the output of the gamma-correcting section 24 to an image signal comparable with, for example, a CCD output of a three-plate camera. The image signal thus generated is supplied to a signal-correcting section 26. The prediction-process section 25 comprises a block-generating section 28, an ADRC (Adaptive Dynamic Range Coding) section 29, a classification process section 30, an adaptation process section 31, a coefficient memory 32, and the like.

The block-generating section 28 supplies a class-tap image signal (described later) to the ADRC process section 29 and a prediction-tap image signal to the adaptation process section 31. The ADRC process section 29 performs ADRC process on the class-tap image signal input to it, thereby generating a re-quantized code. The re-quantized code is supplied, as characteristic data, to the classification process section 30. The classification process section 30 classifies the pattern of the image signal on the basis of the characteristic data supplied from the ADRC process section 29. The section 30 generates a class number (class code) that represents the result of classification. The coefficient memory 32 supplies the adaptation process section 31 with the set of coefficients, which corresponds to the class number generated by the classification process section 30. The adaptation process section 31 uses the set of coefficients supplied from the coefficient memory 32, calculating a predicted pixel value from the prediction-tap image signal supplied from the block-generating section 28.

The signal-correcting section 26 performs so-called picture-forming process, such as edge emphasis, on the image signal processed by the prediction-process section 25, thereby to improve the visual characteristics of the image.

A color-space converting section 27 is provided, which performs matrix conversion on the image signal (RGB signal) that has been subjected to edge emphasis in the prediction-process section 25. The image signal is thereby converted to an image signal of a prescribed format, such as a YUV format (composed of luminance Y and color differences U and V). Alternatively, the color-space converting section 27 may output the RGB signal, without performing the matrix conversion on the RGB signal. In this embodiment of the invention, either a YUV signal or a RGB signal can be output, as the user operates an operation section 20. The image signal output from the color-space converting section 27 is supplied to the interface 14 described above.

Figure 5:
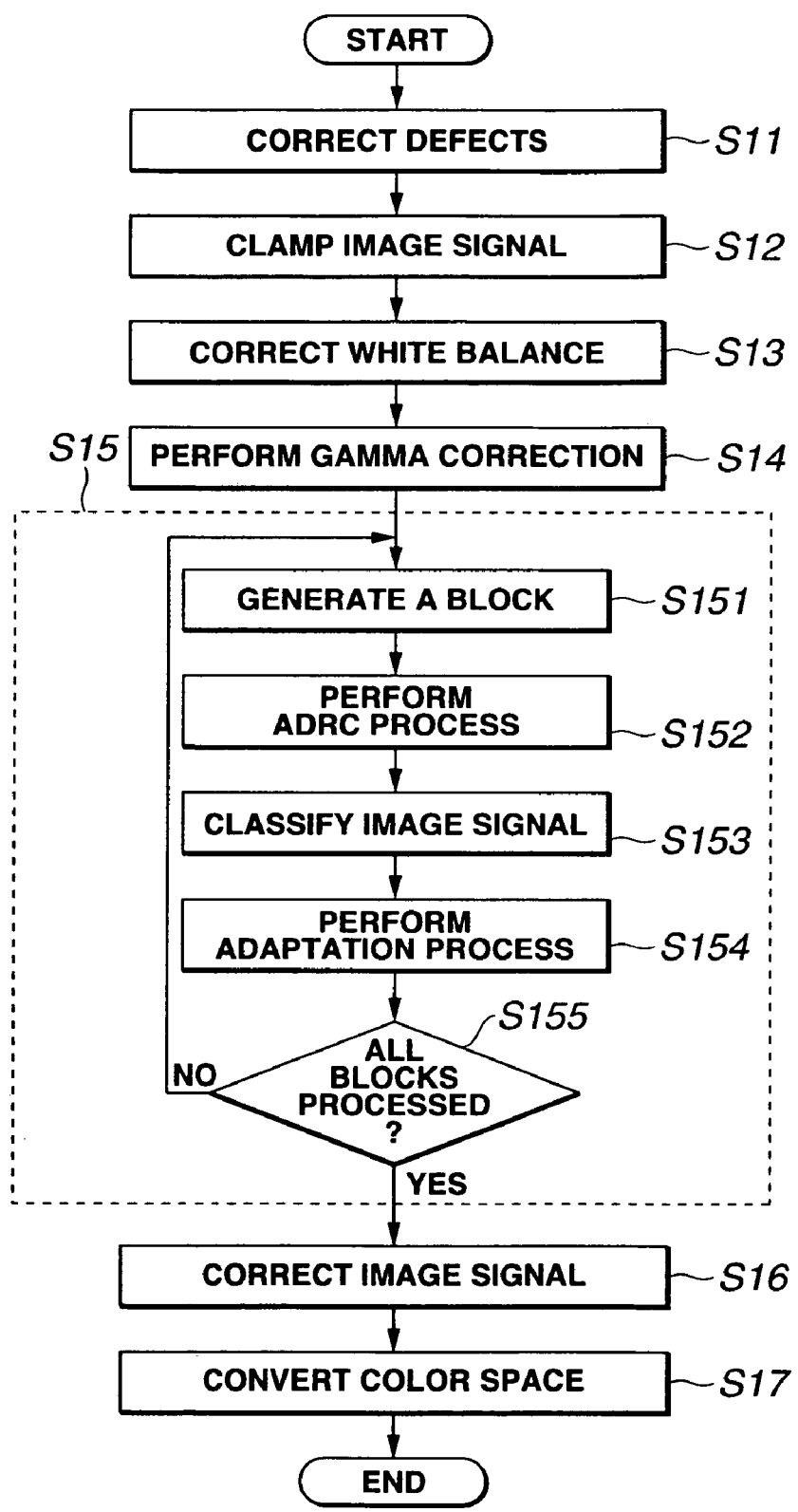
FIG. 5 is a flowchart for explaining how the image signal processing section processes image signals.

How the image-signal processing section 8 processes an image signal in Step S3 shown in the flowchart of FIG. 3 will be described, with reference to the flowchart of FIG. 5.

In the image-signal processing section 8, the A/D converter section 7 starts processing a digital image signal. First, in Step S11, the defect correcting section 21 corrects the image signal, eliminating the defects in the image signal so that the image signal may not be adversely influenced by the defects. In Step S12, the clamping section 22 clamps the image signal that the defect correcting section 21 has corrected, thereby eliminating that component of the image signal which has been shifted to the right.

In Step S13, the white-balancing section 23 corrects the white balance of the image signal that has been clamped by the clamping section 22, thereby adjusting the gains of the color signals. Further, in Step S14, the gamma-correcting section 24 corrects the level of the image signal whose white balance has been corrected by the white-balance correcting section 23, in accordance with a gamma curve.

In Step S15, a classification-adaptation process is effected to predict color signals. This step consists of Steps S151 to S155. In Step S151, the block-generating section 28 processes the image signal the gamma-correcting section 24 has corrected, thus generating a block. In other words, the section 28 extracts a class tap and a prediction tap from the image signal. The class tap contains pixels corresponding to various types of color signals.

In Step S152, the ADRC process section 29 performs an ADRC process.

In Step S153, the classification process section 30 classifies the pattern of the image signal on the basis of the characteristic data supplied from the ADRC process section 29. The section 30 supplies the class number assigned to the pattern classified, to the adaptation process section 31.

In Step S154, the adaptation process section 31 reads the set of coefficients corresponding to the class number supplied from the classification process section 30, from the coefficient memory 32. The section 31 multiplies the coefficients of the set by the image signals that correspond to the coefficients. The coefficient-signal products are added together, thereby predicting pixel values.

In Step 155, it is determined whether or not the processes have been performed on the entire region. If it is determined that the processes have been performed on all regions, the operation goes to Step S16. If not, the operation goes to Step S151 and the next region will be processed.

In Step S16, a correction process (so-called "picture-forming process") is effected on the image signal, which has been generated in Step S15 and which is comparable with one output by the CCD of a three-plate camera, so that the visual characteristics of the resultant image may be improved. In Step S17, color-space conversion is performed on the image signal obtained in Step S16. For example, a RGB signal is converted to a YUV signal.

Figure 6:
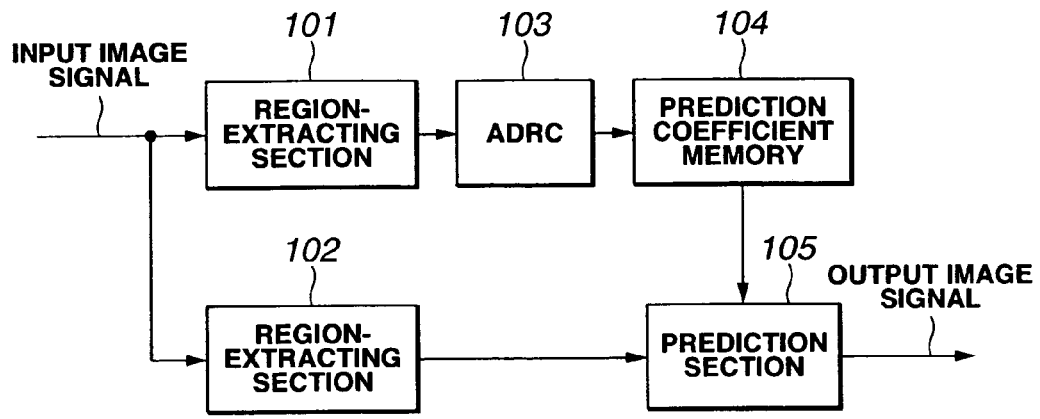
FIG. 6 is a block diagram showing the section for effecting a classification-adaptation process to predict color signals.

The classification-adaptation process will be explained. FIG. 6 shows a section of ordinary type that effects a classification-adaptation process. In this section, the input image is supplied to region-extracting sections 101 and 102. The region-extracting section 101 extracts an image region (called "class tap") from the input image signal and supplies the image region to an ADRC process section 103. The ADRC process section 103 performs ADRC process on the signal supplied to it, thus generating a quantized code.

The ADRC process is carried out to generate the quantized code. Instead, DCT (Discrete Cosine Transform), VQ (Vector Quantization), BTC (Block Trancation Coding), non-linear quantization, or the like may be performed to generate the quantized code.

ADRC is an adaptive re-quantization method that has been developed to achieve high-efficiency encoding in VTRs (Video Tape Recorders). The method is advantageous in that a local signal-level pattern can be expressed in small amount of data. Thanks to this advantage, the method can be utilized to detect a pattern in the time-space, i.e., space activity, of an image signal. The ADRC process section 103 re-quantizes the class tap, i.e., the region extracted. More precisely, it divides the difference between the maximum value MAX and minimum value MIN in the class tap, by the number of bits designated, in accordance with the following equations:

$$DR = MAX - MIN + 1$$

$$Q = [(L - MIN + 0.5) \times 2n/DR] \quad (1)$$

where DR is the dynamic range of the region and n is the number of bits allocated to the region, L is the signal level of pixels present in the region, and Q is the re-quantized code. For example, n may be 2, that is, n=2. The bracket ([ . . . ]) means the process of omitting the decimal fractions.

Thus, an image-signal class tap in which each pixel consists of, for example, eight bits is converted to a 2-bit re-quantized code. The re-quantized code, thus generated, represents the level-distribution pattern in the image-signal class tap, by using a small amount of information. If the class tap is composed of, for example, seven pixels, the above-mentioned process is performed, thereby generating seven re-quantized codes q1 to q7. The class code is of such a type as given by the following equation (2): 1 class=i=1 q i (2 p) i (2)

where n is the number of pixels to be extracted as a class tap. The value for p may be 2, that is, p=2.

The class code, class, is characteristic data that represents the space activity, i.e., the level-distribution pattern in the time-space of the image signal. The class code, class, is supplied to a prediction coefficient memory 104. The prediction coefficient memory 104 stores sets of prediction coefficients, each set assigned to one class as will be described later. The memory 104 outputs the set of prediction coefficients that corresponds to the class identified by the re-quantized code supplied to the memory 104. In the meantime, the region-extracting sections 102 extracts a region of the image (called redicted tap and supplies the image signal of the predicted tap to a prediction section 105. The prediction section 105 performs the operation of the following equation (3) on the set of coefficients supplied from the prediction coefficient memory 104, thereby generating an output image signal y.

$$y = w_1 \times x_1 + w_2 \times x_2 + \ldots + w_n \times x_n \quad (3)$$

where $x_1$, and xn are the values of the pixels constituting the predicted tap, and w1, and wn are the prediction coefficients.

Figure 7:
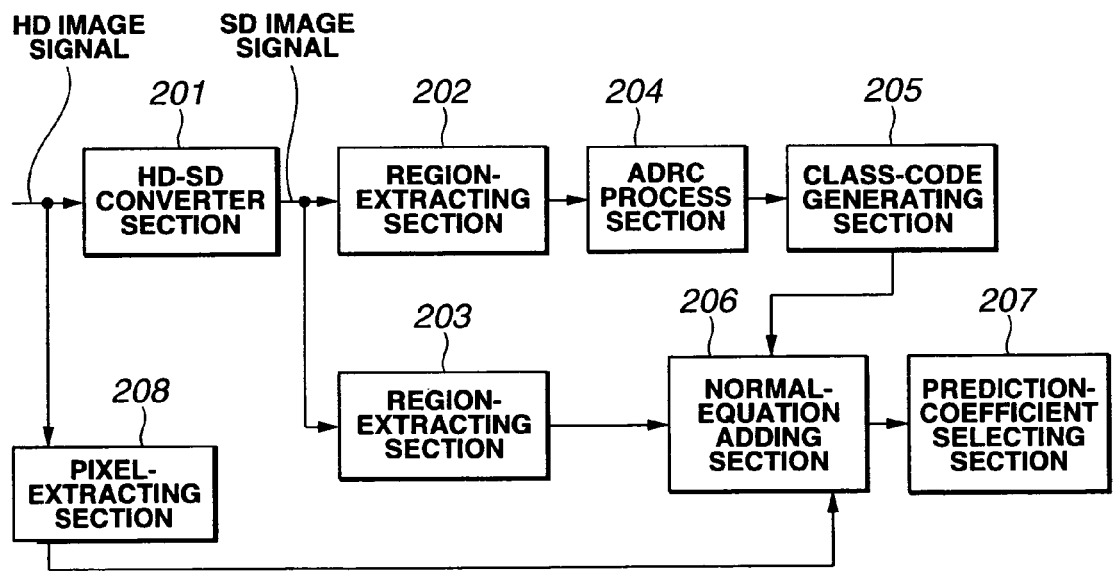
FIG. 7 is a block diagram depicting a section designed to determine a set of prediction coefficients.

The process of determining which set of prediction coefficients should be applied will be explained, with reference to FIG. 7. A HD (High-Definition) image signal having the same image format as the output image signal is supplied to a HD-SD converter section 201 and a pixel-extracting section 208. The HD-SD converter section 201 carries out extraction or the like, whereby the HD image signal is converted to an image signal (hereinafter referred to as "SD (Standard-Definition) image signal") that has a resolution (i.e., number of pixels) similar to that of the input image signal. The SD image signal is supplied to a region-extracting sections 202 and 203. Like the region-extracting section 101 described above, the region-extracting section 202 extracts a class tap from the SD image signal and generates an image signal representing the class tap. This signal is supplied to an ADRC process section 204.

The ADRC process section 204 performs the same ADRC process as does the ADRC process section 103 shown in FIG. 6. That is, the section 204 performs ADRC process, thus generating a re-quantized code from the signal supplied to it. The re-quantized code is supplied to a class-code generating section 205. The class-code generating section 205 is generates a class code that represents the class of the re-quantized code supplied to the section 205. The class code is supplied to a normal-equation adding section 206. Meanwhile, the region-extracting section 203 extracts a predicted tap from the SD image signal in the same way as does the region-extracting section 102 shown in FIG. 6. The image signal representing this predicted tap is supplied to the normal-equation adding section 206.

The normal-equation adding section 206 adds the image signals supplied from the region-extracting sections 203 to the image signals supplied from a pixel-extracting section 208, for each class code supplied from the class-code generating section 205. The signals, thus added for each class code, are supplied to a prediction-coefficient determining section 207. On the basis of the signals for each class code, the prediction-coefficient determining section 207 selects prediction coefficients that constitute a set to be applied to the class code.

The operation that is performed to determine a set of prediction coefficients will be explained. Prediction coefficient w1 is calculated as will be described, by supplying various image signals, or HD image signals, to the section illustrated in FIG. 7. Assuming that the number of the image signals supplied is m, we obtain the following equation (4) from the equation (3):

$$y_k = w_1 \times x_{k1} + w_2 \times x_{k2} + \ldots + w_n \times x_{kn} \quad (4)$$

If m>n, coefficients $w_1, \ldots,$ and wn cannot be determined directly. Thus, the element ek of an error vector e is defined as shown in the following equation (5), thereby to determine a set of prediction coefficients so that the square of the error vector e defined by the equation (6) presented below may become minimal. That is, so-called "least squares method" is applied, thereby directly determining a set of prediction coefficients. 2 e k=y k−{w 1 .times. x k1+w 2.times. k 2++ w n .times. k n} (k=1, 2, m)(5) 2=k=0 m e k 2 (6)

A method that may actually used to obtain a set of prediction coefficients, which minimizes the value $e^2$ in the equation (6), is to find partial differential values of $e^2$ for the prediction coefficients $w_i$ (i=1, 2, . . . ), as indicated by the following equation (7). In the method it suffices to determine each prediction coefficient to impart a partial differential value of 0 to the prediction coefficient. 3 2 w i=k=0 m 2 [e k w i] e k=k=0 m 2 X ki e k (7)

The sequence of operations for determining the prediction coefficients by using the equation (7) will be described. Let $X_{ji}$ and $Y_i$ be defined by the equations (8) and (9). The equation (7) can then be rewritten to the following equation (10): 4 X ij=p=0 m X pi X pj (8) Y i=k=0 m y ki y k (9) [X 11 X 12 X 1 n X 21 X 22 X 2 n X n1 X n2 X nn] [W 1 W 2 W n]=[Y 1 Y 2 Y n](10)

The equation (10) is generally called "normal equation." The normal-equation adding section 205 carries out operations of the equations (8) and (9) on the signal supplied to it, thereby calculating $X_{ji}$ and Yi (i=1, 2, . . . , n). The prediction-coefficient determining section 207 solves the normal equation (10) by using an ordinary matrix analysis, thereby calculating prediction coefficients $w_i$ (i=1, 2.

In this instance, the set of prediction coefficients and the prediction tap, which correspond to the characteristic data of a pixel of interest, are applied, performing operations on a linear combination model. An adaptation process is thereby performed. The set of prediction coefficients, which is used to perform the adaptation process, can be acquired by learning. Alternatively, the adaptation process can be accomplished by using the pixel values corresponding to the class or by effecting operations on the linear combination model.

The classification-adaptation process described above achieves various conversions of image signals, which generate noise-free image signals from input image signals, image signals having their scanning-line schemes converted, and the like. These signals generated are used as output image signals.

In the digital still camera 1, a plurality of pixels near each pixel of interest are extracted from an input image signal that has any one of the color components which the CCD image sensor of the camera 1 (single-plate camera) has generated.

The class is determined on the basis of the pixels thus extracted. The normal-equation adding section 205 performs the classification-adaptation process, thus generating, at the position of the pixel of interest, a pixel having a color component different from that of the pixel of interest. Thus, the camera can output an image signal that is equivalent to one output by the CCD of a three-plate camera.

Figure 8:
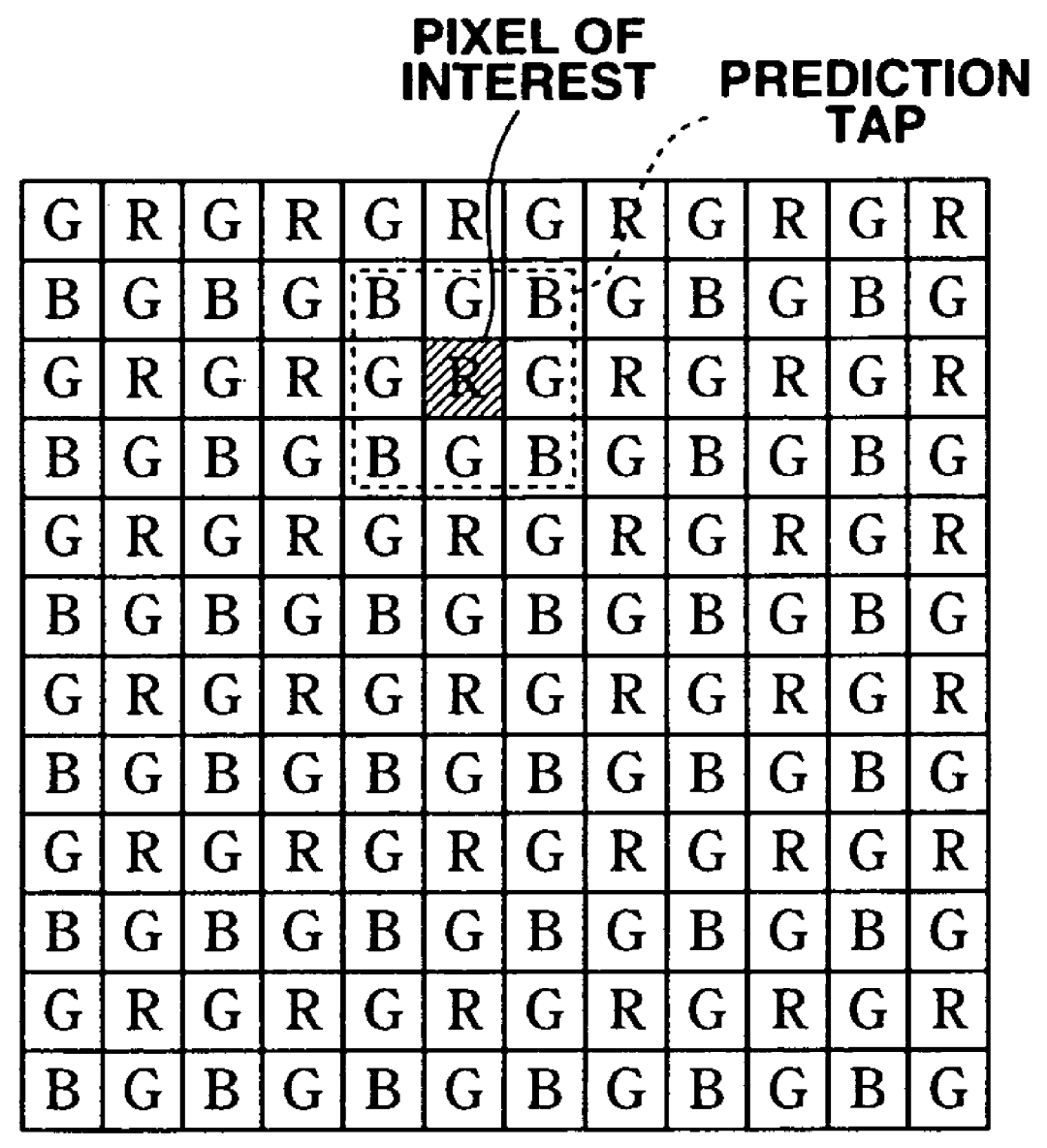

FIG. 8 shows the structure of a prediction tap. The prediction tap is composed of 9 pixels forming a 3.times.3 matrix, the central pixel being the pixel of interest (i.e., the pixel to be processed). The block-generating section 28 extracts the prediction tap for each pixel of interest, thereby generating a plurality of blocks, each consisting of 9 pixels, the central one of which is the pixel of interest that corresponds to the prediction tap. The pixel of interest may be any one of the pixels that constitute one frame.

Figures 9A, 9B, 9D:
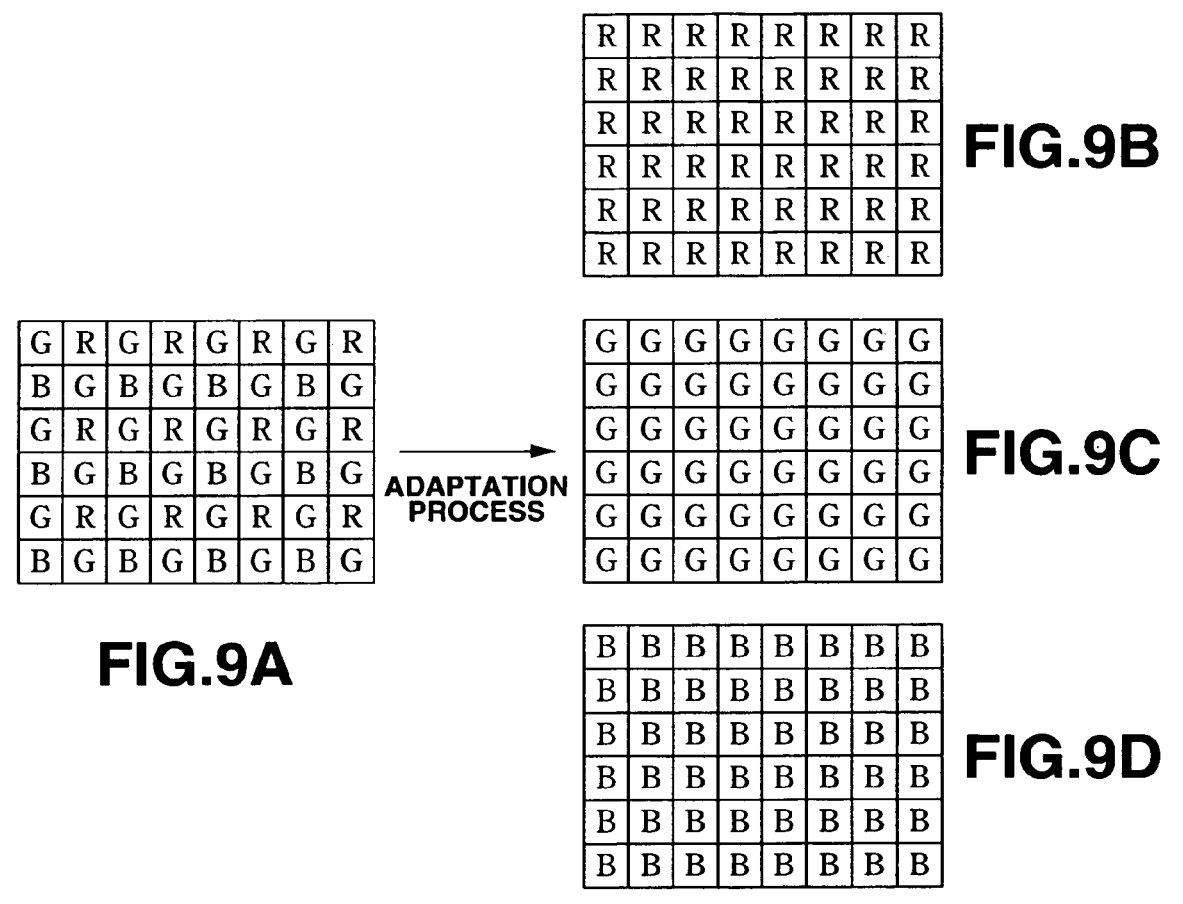

The adaptation process section 31 performs the adaptation process. If the pixel signal representing the pixel of interest is an R signal, an R signal, a G signal and a B signal will be generated at the position of the/pixel represented by the R signal. If the pixel signal is a G signal or a B signal, an R signal, a G signal and a B signal will be generated at the position of the pixel represented by the G signal or the B signal. Consider a one-frame image signal that is composed of 8.times.6 pixels as shown in FIG. 9A. When the 8.times.6 pixels sequentially subjected to the adaptation process, each as a pixel of interest, 8.times.6 R signals are obtained as shown in FIG. 9B, 8.times.6 G signals are obtained as shown in FIG. 9C, and 8.times.6 B signals are obtained as shown in FIG. 9D. In other words, an image signal is generated, which is equivalent to one output by the CCD of a three-plate camera.

In the digital still camera 1 according to this invention, a classification-adaptation process is effected, generating color signals R, G and B that are equivalent to the outputs of the CCD of a three-plate camera. Thus, the edge parts and fine parts of the image increase in sharpness, and the S/N ratio of the image signal increases To generate an R signal for the central pixel (G22) in the 3.times.3 pixel matrix (G.sub.11, B.sub.12, B.sub.32 and G.sub.33) of FIG. 1A, the set of prediction coefficients (w.sub.1 to w.sub.9) shown in FIG. 10B is used. Note that the prediction coefficients (w.sub.1 to w.sub.9) correspond to 3.times.3 pixels (G.sub.11, B.sub.12, . . . B.sub.32, G.sub.33). In the set of prediction coefficients, shown in FIGS. 10A and 10B, the pixel (G.sub.22) of interest is a G signal. Pixels (B.sub.12 and B.sub.32), both being B signals, are arranged above and below the pixel (G.sub.22) of interest, i.e., a G signal, respectively. Pixels (R.sub.21 and R.sub.23), both being R signals, are arranged to the left and right of the pixel (G.sub.22) of interest, respectively. Pixels (G.sub.11, G.sub.13, G.sub.31 and G.sub.33), each being G signal, are arranged at upper-left, upper-right, lower-left and lower-right positions with respect to the pixel (G.sub.22) of interest, respectively. The prediction coefficients of this set are used to generate an R signal at the position of the G signal that is the pixel (G.sub.22) of interest.

Figures 1A, 1B, 1C:
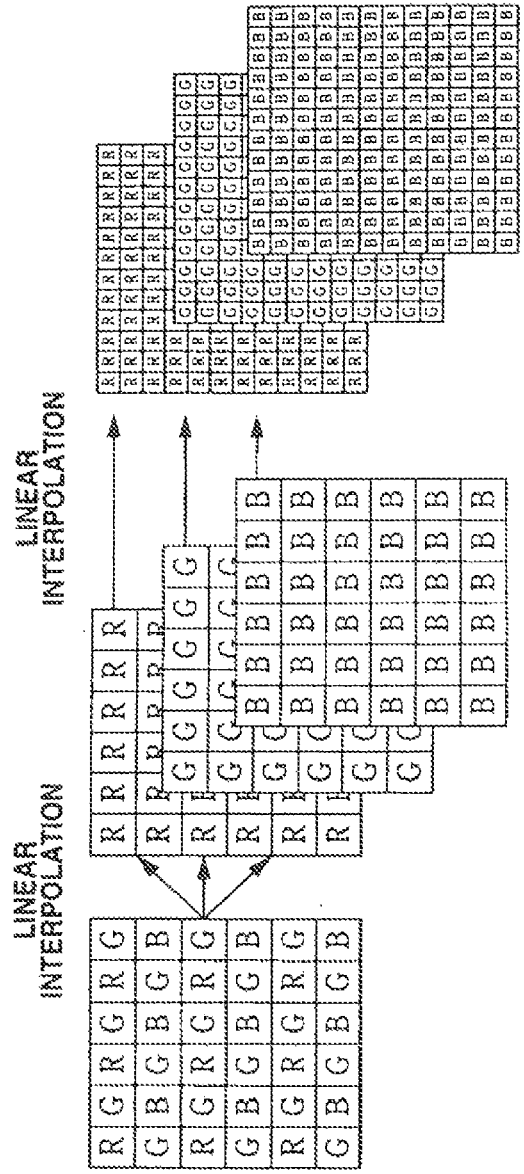
FIG. 1A, FIG. 1B and FIG. 1C are diagrams schematically illustrating the conventional processing of image signals by means of the linear interpolation.

To generate an R signal for the central pixel (R.sub.22) in the 3.times.3 pixel matrix (G.sub.11, R.sub.12, R.sub.32 and G.sub.33) of FIG. 11A, the set of prediction coefficients (w.sub.1 to w.sub.9) shown in FIG. 1B is used. Note that the prediction coefficients (w.sub.1 to w.sub.9) correspond to 3.times.3 pixels (G.sub.11, B.sub.12, . . . B.sub.32, G.sub.33). In the set of prediction coefficients, shown in FIGS. 11A and 11B, the pixel (G.sub.22) of interest is a G signal. An R signal will be generated at the position of this pixel (G.sub.22) of interest. Pixels (R.sub.12 and R.sub.32), both being R signals, are arranged above and below the pixel (G.sub.22) of interest, i.e., a G signal, respectively. Pixels (B.sub.21 and B.sub.23), both being G signals, are arranged to the left and right of the pixel (G.sub.22) of interest, respectively. The prediction coefficients (w.sub.1 to w.sub.9) of this set are used to generate an R signal at the position of the G signal that is the pixel (G.sub.22) of interest.

To generate an R signal for the central pixel (B.sub.22) in the 3.times.3 pixel matrix (R.sub.11, G.sub.12, . . . , G.sub.32 and R.sub.33) of FIG. 12A, the set of prediction coefficients (w.sub.1 to w.sub.9) shown in FIG. 12B is used. Note that the prediction coefficients (w.sub.1 to w.sub.9) correspond to 3.times.3 pixels (R.sub.11, G.sub.12, . . . , G.sub.32, R.sub.33). In the set of prediction coefficients, shown in FIGS. 12A and 12B, the pixel (B.sub.22) of interest is a B signal. Pixels (G.sub.12 and G.sub.32), both being G signals, are arranged above and below the pixel (B.sub.22) of interest, i.e., a B signal, respectively. Pixels (G.sub.21 and G.sub.23), both being G signals, are arranged to the left and right of the pixel (B.sub.22) of interest, respectively. Pixels (R.sub.11, R.sub.13, R.sub.31 and R.sub.33), each being R signal, are arranged at upper-left, upper-right, lower-left and lower-right positions with respect to the pixel (B.sub.22) of interest, respectively. The prediction coefficients (w.sub.1 to w.sub.9) of this set are used to generate an R signal at the position of the B signal that is the pixel (B.sub.22) of interest.

The sets of prediction coefficients, described above, have been acquired by learning and are stored in the coefficient memory 32.

Figure 13:
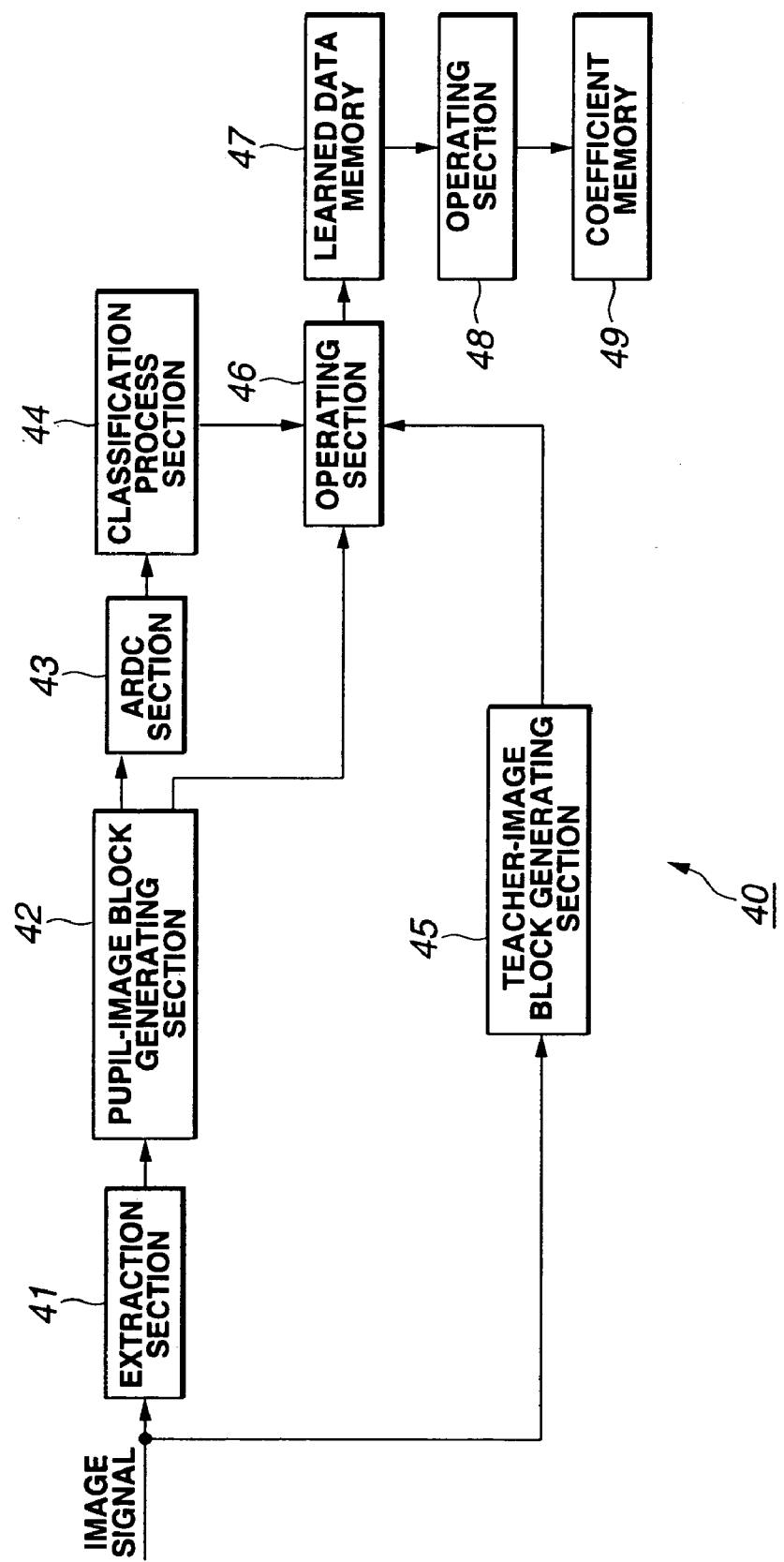
FIG. 13 is a block diagram showing a learning apparatus that acquires sets of prediction coefficients by learning.

How the sets of prediction coefficients are acquired by learning will be explained. FIG. 13 is a block diagram showing shows a learning apparatus 40 that acquires sets of prediction coefficients by learning.

In the learning apparatus 40, an image signal is supplied, as a teacher image signal, to an extraction section 41 and a teacher-image block generating section 45. The teacher image signal has the same signal format as the output signal to be generated as the result of a classification-adaptation process. In other words, the teacher image signal is identical in format to an image signal that is equivalent to the outputs of the CCD of a three-plate camera. The extraction section 41 extracts pixels from the teacher-image signal, in accordance with the arrangement of the color filters constituting an array. Pixels are extracted from the teacher-image signal by using filters equivalent to the optical low-pass filters, with respect to the CCD image sensor 5. That is, pixels are extracted in consideration of the optical system actually employed. The output of the extraction section 41 is a student-image signal, which is supplied to a student-image block generating section 42.

The student-image block generating section 42 extracts the class tap and prediction tap related to the pixel of interest, from the student-image signal generated by the extraction section 41, while referring to the relation between the teacher-image signal and the predicted pixel for each block. The section 42 converts the student-image signal to a block, which is supplied to an ADRC process section 43 and an operating section 46. The ADRC process section 43 performs an ADRC process on the student-image signal supplied from the student-image block generating section 42, thereby generating characteristic data. The characteristic data is supplied to a classification process section 44. The classification process section 44 generates a class code from the characteristic data input to it. The class code is output to an operating section 46.

The teacher-image signal is an image signal that has a resolution similar to that of the CCD output of a single-plate camera. In other words, the teacher-image signal has a lower resolution than a image signal generated by a three-plate camera. Thus, the teacher-image signal represents pixels, each consisting of a R component, a G component and a B component. By contrast, the student-image signal represents pixels, each consisting of only one of the R, G and B components.

The teacher-image block generating section 45 extracts the image signal representing the predicted pixel, from the teacher-image signal, while referring to the class tap of the student-image signal. The relation between the class tap teacher-image signal and the predicted pixel for each block. The image signal extracted and representing the predicted pixel is supplied to the operating section 46. The operating section 46 carries out an operation on the class number supplied from the classification process section 44, while maintaining the relation between the image signal of the prediction tap supplied from the student-image block generating section 42 and the predicted image supplied from the teacher-image block generating section 45. Thus, the operating section 46 generates the data of a normal equation, the solution of which is a set of prediction coefficients. The data of the normal equation, generated by the operating section 46, is sequentially read into a learned data memory 47 and held therein.

Another operating section 48 is provided, which solves a normal equation by using the data stored in the learned data memory 47. The set of prediction coefficients is thereby calculated for one class. The set of prediction coefficients, thus calculated, is stored into a coefficient memory 49 and associated with the class. The contents of the coefficient memory 49 are loaded into the coefficient memory 32 described above, and will be utilized to achieve the classification-adaptation process.

Figure 14:
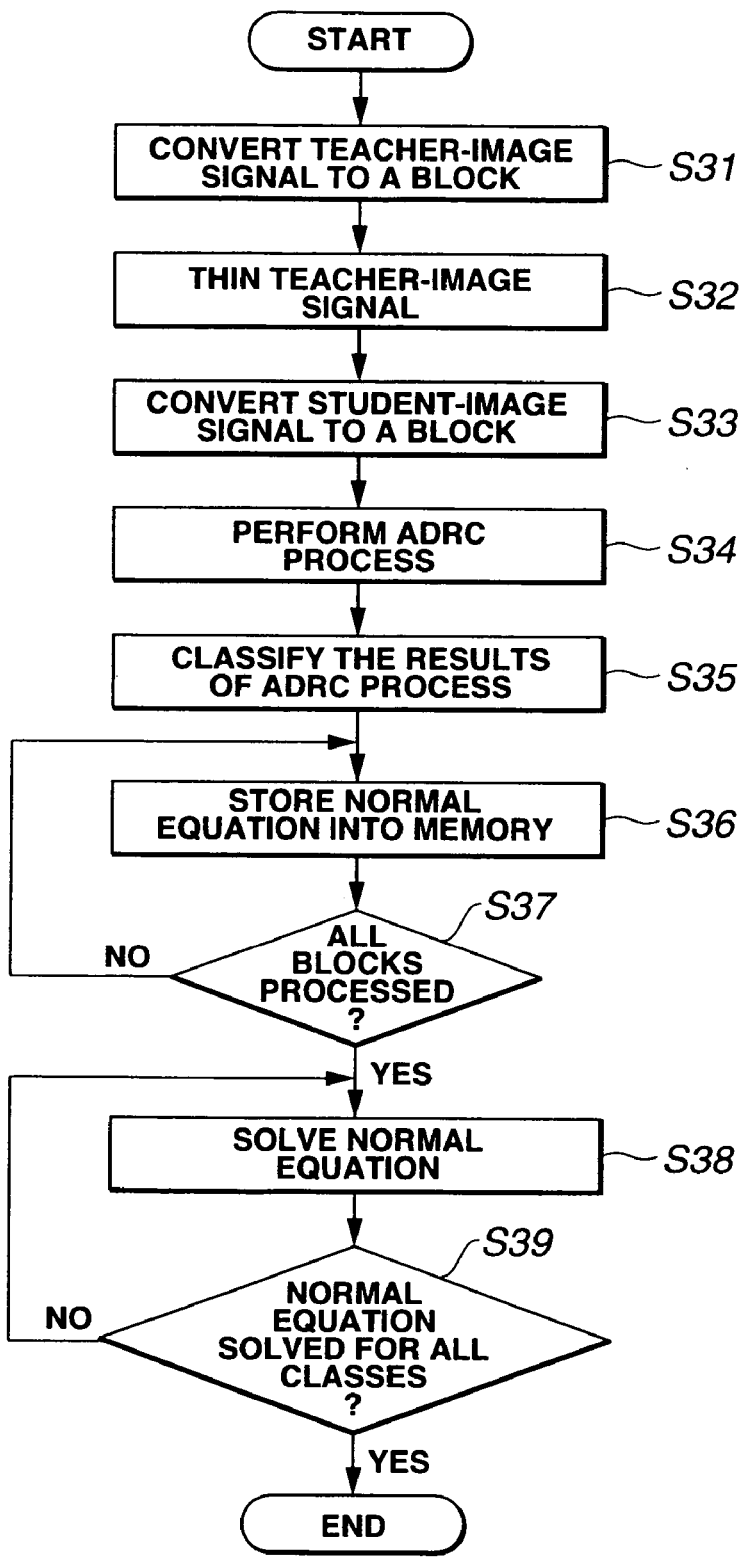
FIG. 14 is a flowchart for explaining how the learning apparatus operates.

How the learning apparatus 40 functions will be explained with reference to the flowchart of FIG. 14.

Figures 15A, 15B, 15C:
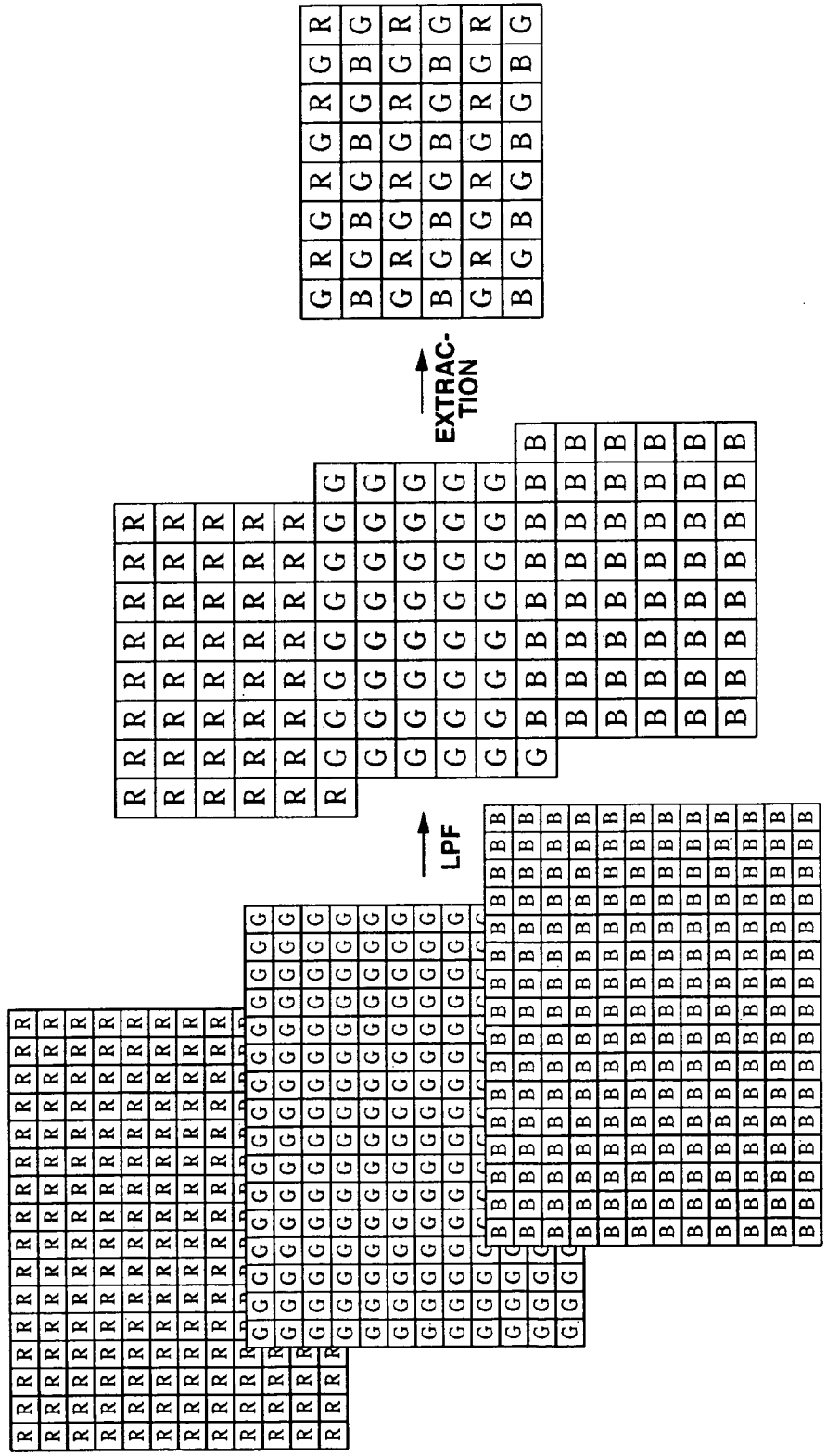
FIGS. 15A, 15B and 15C are diagrams schematically showing how the learning apparatus operates.

The digital image signal input to the learning apparatus 40 represents an image that is comparable, in terms of quality, with an image picked up by a three-plate camera. An image signal generated by a three-plate camera (i.e., a teacher-image signal) represents pixels, each having three primary-color signals, R, G and B. On the other hand, an image signal generated by a single-plate camera (i.e., a student-image signal) represents pixels, each having only one of three primary-color signals, R, G and B. The teacher-image signal input to the learning apparatus 40 is, for example, a teacher-image signal that has been generated by filtering an HD image signal output by a three-plate camera and illustrated in FIG. 15A and then converting the HD signal to a ¼-size HD image signal shown in FIG. 15B.

In Step S31, the teacher-image block generating section 45 converts the input teacher-image signal to a block. In Step S31, too, the student-image block generating section 42 extracts the value of the predicted pixel located at a position corresponding to the pixel to be designated as the pixel of interest and supplies the pixel value to the operating section 46.

In Step S32, the extraction section 41 thins the teacher-image signal that represents an image comparable, in quality, with an image picked up by a three-plate camera, by effecting a filtering process equivalent to one accomplished by the color-coding filter 5 provided in the CCD image sensor 5 of the single-plate camera. The section 41 generates a student-image signal of the type shown in FIG. 15C, which corresponds to the image signal output from the CCD image sensor 5 incorporated in the single-plate camera. The student-image signal, thus generated, is output to the student-image block generating section 42.

In Step S33, the student-image block generating section 42 converts the input student-image signal to a block. The section 42 generates a class tap and a prediction tap for the block, on the basis of the pixel of interest.

In Step S34, the ADRC process section 43 carries out the ADRC process on the color signals of the class extracted from the student-image signal.

In Step S35, the classification process section 44 classifies the results of the ADRC process and generates a signal representing the class number assigned to the ADRC results classified.

In Step S36, the operating section 46 generates the above-mentioned normal equation (10) for the class number supplied from the classification process section 44, on the basis of the prediction tap supplied from the student-image block generating section 42 and the predicted image supplied from the teacher-image block generating section 45. The normal equation (10) is stored into the learned data memory 47.

In Step S37, it is determined whether the operating section 46 has finished processing all blocks or not. If there are any blocks not processed yet, the operation returns to Step S36. In this case, Steps S36 and S37 are repeated. If it is determined that all blocks have been processed, the operation goes to Step S38.

In Step S38, the operating section 48 solves the normal equation stored in the learned data memory 47 by means of, for example, the Gauss-Jordan elimination or the Kolensky decomposition, thereby calculating a set of prediction coefficients. The set of prediction coefficients, thus calculated, is stored into the coefficient memory 49 and associated with the class code output from the classification process section 44.

In Step S39, it is determined whether or not the operating section 48 has solved the normal equation for all classes. If the equation has not been solved for any classes, the operation returns to Step S38. In this case, Steps S38 and S39 are repeated.

If it is determined in Step S39 that the normal equation has been solved for all classes, the operation is terminated.

Figure 4:
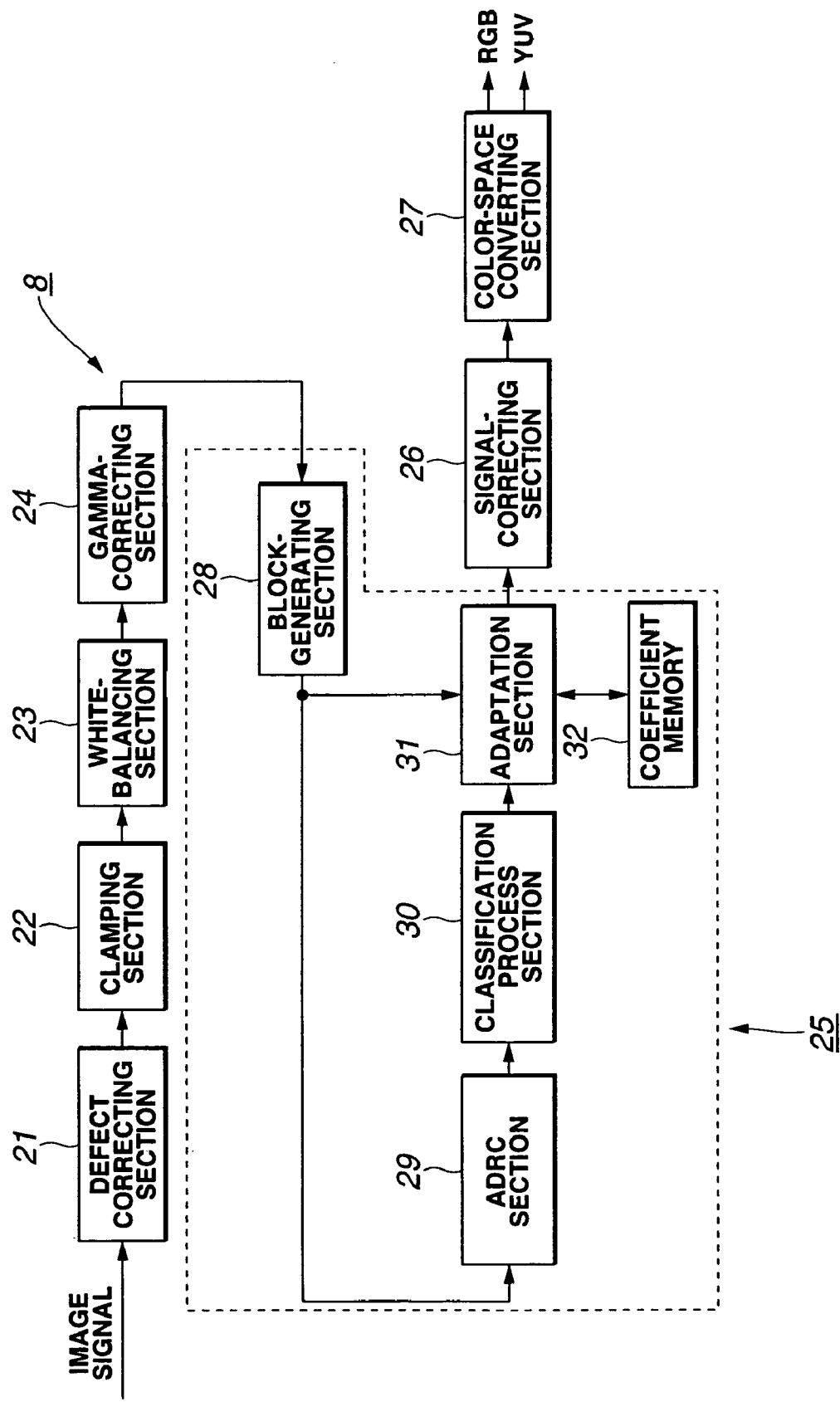
FIG. 4 is a block diagram showing the structure of the image signal processing section incorporated in the digital still camera.

The set of prediction coefficients, which is stored in the coefficient memory 49, associated with the class code, is stored into the coefficient memory 32 of the image-processing section 8 illustrated in FIG. 4. The adaptation process section 31 provided in the image-signal processing section 8 utilizes the set of prediction coefficients, held in the coefficient memory 32, carrying out an adaptation process on the pixel of interest, by using the linear combination model expressed by the equation (3).

FIGS. 16A to 16C, FIGS. 17A to 17C, FIGS. 18A to 18C and FIGS. 19A to 19C show class taps. The class taps are used to determine classes when an image signal color-coded by the color-filter array of Bayer arrangement is processed to generate an R signal, a G signal or a B signal at the position of the pixel of interest (the pixel shaded in the figure). The class taps are also used when a set of prediction coefficients is calculated to be applied in the process of generating the R, G or B signal.

Figures 16A, 16B, 16C:
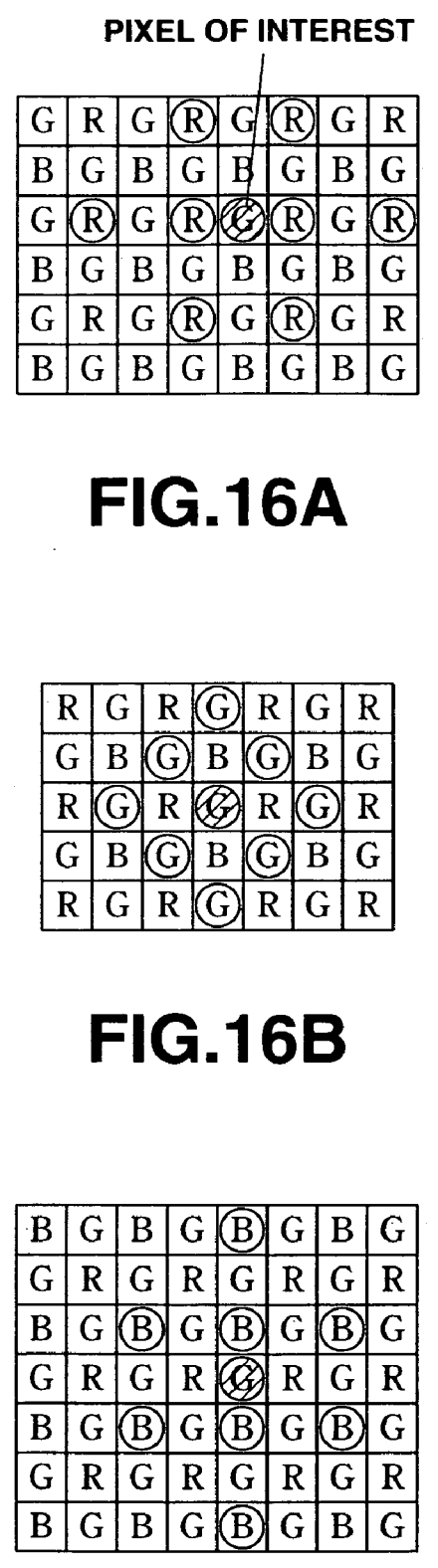

The class taps 1 shown in FIGS. 16A to 16C include two R signals each. The R signals are arranged to the left and right of a G signal that is the pixel of interest.

The class tap 1 shown in FIG. 16A is used to calculate a set of prediction coefficients that will be applied to generate an R signal at the position of the G signal for the pixel of interest. The class tap 1 is composed of eight pixels. More precisely, it consists of two R-signal pixels arranged to the left and right of the G-signal pixel (i.e., the pixel of interest), two R-signal pixels arranged above and below the first R-signal pixel and spaced apart therefrom by one pixel-distance, respectively, two R-signal pixels arranged above and below the second R-signal pixel and spaced apart therefrom by a one-pixel distance, respectively, and two R-signal pixel arranged to the left of the first R-signal pixel and right of the second R-signal pixel and spaced apart therefrom by a one-pixel distance, respectively.

The class tap 1 shown in FIG. 16B is used to calculate a set of prediction coefficients that will be applied to generate a G signal at the position of the G signal for the pixel of interest This class tap 1 is composed of nine pixels. More precisely, it consists of the G-signal pixel of interest, four G-signal pixels arranged at upper-left, upper-right, lower-left and lower-right positions with respect to the G-signal pixel of interest, respectively, two G-signal pixels arranged above and below the G-signal pixel of interest and spaced apart therefrom by one pixel-distance, respectively, and two G-signal pixels arranged to left and right of the G-signal pixel of interest and spaced apart therefrom by a one-pixel distance, respectively.

The class tap 1 shown in FIG. 16C is used to calculate a set of prediction coefficients that will be applied to generate a B signal at the position of the G signal for the pixel of interest. The class tap 1 is composed of eight pixels. More specifically, it consists of two B-signal pixels arranged above and below the G-signal pixel of interest, respectively, two B-signal pixels arranged to left and right of the first B-signal pixel and spaced by a one-pixel distance, two B-signal pixels arranged to left and right of the second B-signal pixel and spaced by a one-pixel distance, two B-signal pixels arranged above the first B-signal pixel and below the second B-signal pixel and spaced therefrom by a one-pixel distance, respectively.

Figures 17A, 17B, 17C:
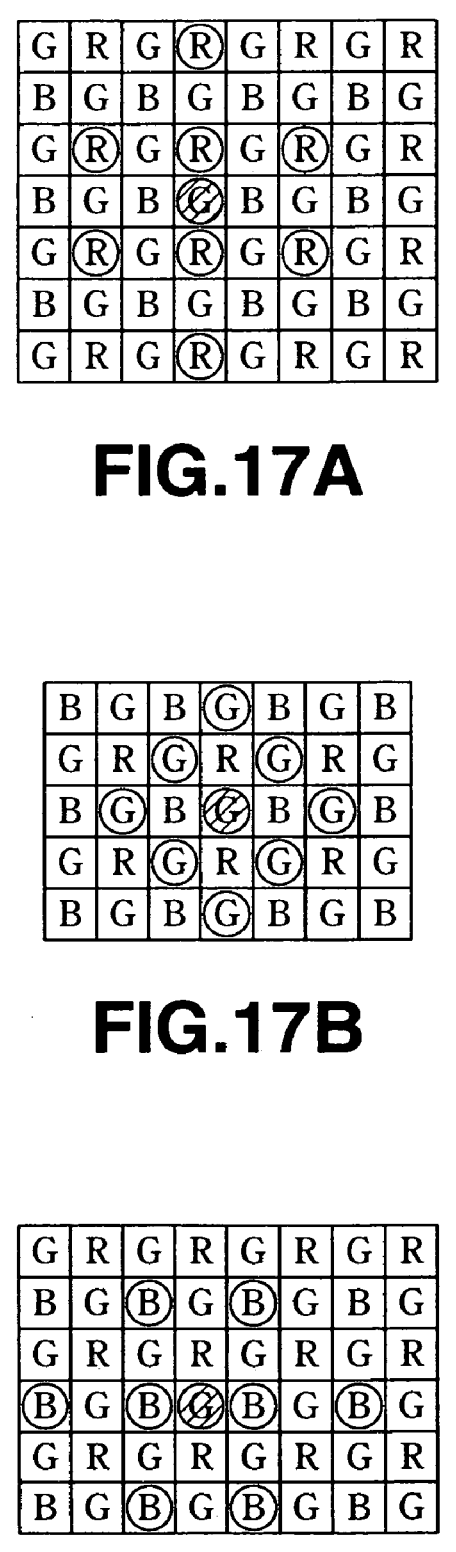

The class taps 2 shown in FIGS. 17A to 17C include two R signals each. The R signals are arranged to the left and right of a G signal that is the pixel of interest.

The class tap 2 shown in FIG. 17A is used to calculate a set of prediction coefficients that will be applied to generate an R signal at the position of the G signal for the pixel of interest. The class tap 2 is composed of eight pixels. To be more specific, it consists of two R-signal pixels arranged above and below the G-signal pixel of interest, respectively, two R-signal pixels arranged above the first R-signal pixel and below the second R-signal pixel and spaced therefrom by a one-pixel distance, respectively, two R-signal pixels arranged to the left and right of the first R-signal pixel and spaced therefrom by a one-pixel distance, respectively, and two R-signal pixels arranged to the left and right of the second R-signal pixel and spaced therefrom by a one-pixel distance, respectively.

The class tap 2 shown in FIG. 17B is used to calculate a set of prediction coefficients that will be applied to generate a B signal at the position of the G signal for the pixel of interest. The class tap 2 is composed of nine pixels. More correctly, it consists of the G-signal pixel of interest, four G-signal pixels arranged at upper-left, upper-right, lower-left and lower-right positions with respect to the G-signal pixel of interest, respectively, two G-signal pixels arranged above and below the G-signal pixel it consists of two B-signal pixels arranged to the left and right of the G-signal pixel of interest, two B-signal pixels arranged above and below the first B-signal pixel and spaced apart therefrom by one pixel-distance, two B-signal pixels arranged above and below the second B-signal pixel and spaced apart therefrom by a one-pixel distance, and two B-signal pixels arranged to the left of the first B-signal pixel and left of the second B-signal pixel and spaced apart therefrom by a one-pixel distance, respectively.

Figures 18A, 18B, 18C:
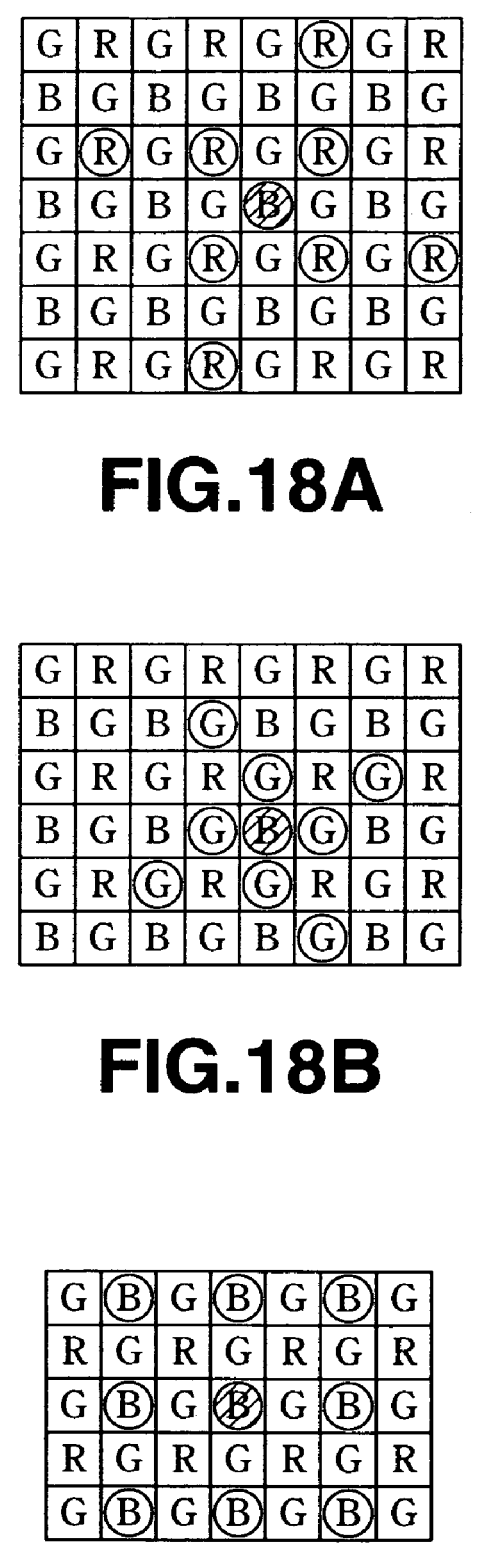

The class taps 3 shown in FIGS. 18A to 18C include two R signals each. The G signals are arranged to the left and right of a B signal that is the pixel of interest.

The class tap 3 shown in FIG. 18A is used to calculate a set of prediction coefficients that will be applied to generate an R signal at the position of the G signal for the pixel of interest. The class tap 3 is composed of eight pixels. More precisely, it consists of four R-signal pixels arranged at upper-left, upper-right, lower-left and lower-right positions with respect to the G-signal pixel of interest, respectively, an R-signal pixel arranged above the first R-signal pixel and spaced therefrom by a one-pixel distance, an R-signal pixel arranged to the left of the second R-signal pixel and spaced therefrom by a one-pixel distance, an R-signal pixel arranged to the below the third R-signal pixel and spaced therefrom by a one-pixel distance, and an R-signal pixel arranged to the right of the fourth R-signal pixel and spaced therefrom by a one-pixel distance.

The class tap 3 shown in FIG. 18B is used to calculate a set of prediction coefficients that will be applied to generate a G signal at the position of the B signal for the pixel of interest. This class tap 3 is composed of eight pixels. To be more specific, it consists of four R-signal pixels arranged at upper-left, upper-right, lower-left and lower-right positions with respect to the G-signal pixel of interest, respectively, a G-signal pixel arranged at an upper-left position with respect to the first G-signal pixel, a G-signal pixel arrange at an lower-left position with respect to the second G-signal pixel, a G-signal pixel arranged at an lower-right position with respect to the third G-signal pixel, and a G-signal pixel arranged at an upper-right position with respect to the fourth G-signal pixel.

The class tap 3 shown in FIG. 18C is used to calculate a set of prediction coefficients that will be applied to generate a B signal at the position of the B signal for the pixel of interest. This class tap 3 is composed of nine pixels. To be more specific, it consists of the B-signal pixel of interest, two B-signal pixels arranged above and below the B-signal pixel of interest and spaced therefrom by a one-pixel distance, respectively, two B-signal pixels arranged to left and write of the B-signal pixel of interest and spaced therefrom by a one-pixel distance, respectively, and four B-signal pixels arranged at upper-left, upper-right, lower-left and lower-right positions with respect to the G-signal pixel of interest and spaced therefrom by a one-pixel distance, respectively.

Figures 19A, 19B, 19C:
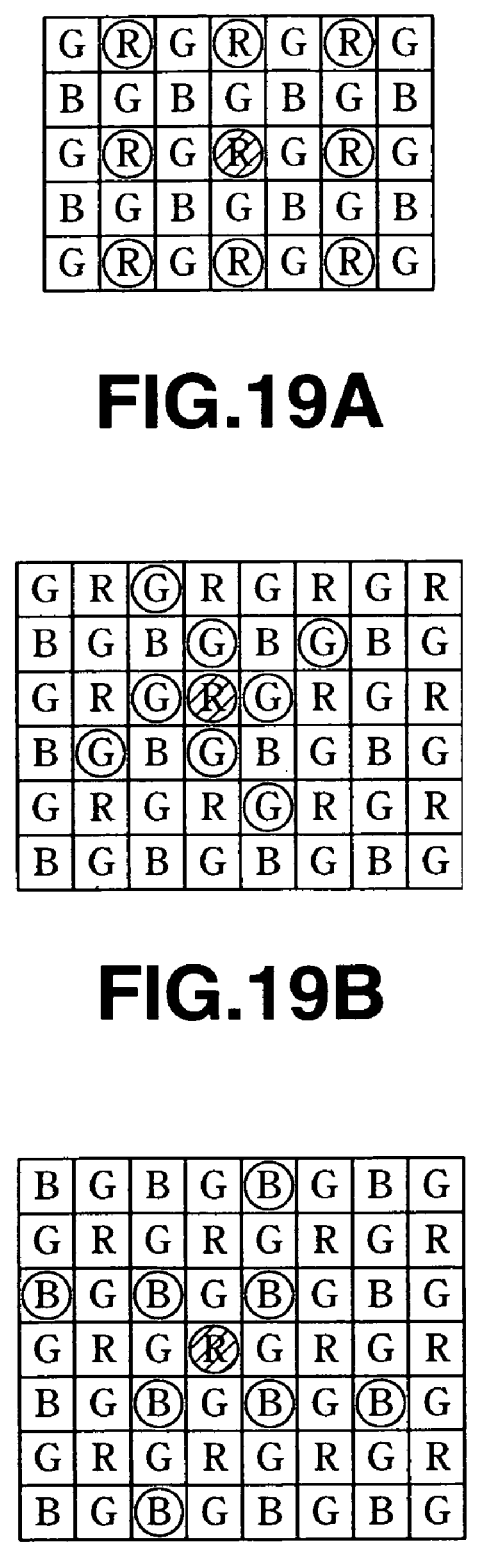

The class taps 4 shown in FIGS. 19A to 19C include two G signals each. The G signals are arranged to the left and right of an R signal that is the pixel of interest.

The class tap 4 shown in FIG. 19A is used to calculate a set of prediction pixels arranged at upper-left, upper-right, lower-left and lower-right positions with respect to the G-signal pixel of interest and spaced therefrom by a one-pixel distance, respectively.

The class taps 4 shown in FIGS. 19A to 19C include two G signals each. The G signals are arranged to the left and right of an R signal that is the pixel of interest.

The class tap 4 shown in FIG. 19A is used to calculate a set of prediction coefficients that will be applied to generate an R signal at the position of the R signal for the pixel of interest. The class tap 4 is composed of nine pixels. More correctly, it consists of the R-signal pixel of interest, two R-signal pixels arranged a above and below the R-signal pixel of interest and spaced apart therefrom by a one-pixel distance, respectively, two R-signal pixels arranged to the left and right of the R-signal pixel of interest and spaced apart therefrom by a one-pixel distance, respectively, and four R-signal pixels arranged at upper-left, upper-right, lower-left and lower-right positions with respect to the R-signal pixel of interest and spaced therefrom by a one-pixel distance, respectively.

The class tap 4 shown in FIG. 19B is applied to calculate a set of prediction coefficients that will be applied to generate a G signal at the position of the R signal for the pixel of interest. This class tap 4 is composed of eight pixels. More correctly, it has of four G-signal pixels arranged at upper-left, upper-right, lower-left and lower-right positions with respect to the R-signal pixel of interest, respectively. Further, it has a G-signal pixel arranged at an upper-left position with respect to the first G-signal pixel and spaced therefrom by a one-pixel distance, a G-signal pixel arrange at an lower-left position with respect to the second G-signal pixel and spaced therefrom by a one-pixel distance, a G-signal pixel arranged at an lower-right position with respect to the third G-signal pixel and spaced therefrom by a one-pixel distance, and a G-signal pixel arranged at an upper-right position with respect to the fourth G-signal pixel and spaced therefrom by a one-pixel distance.

The class tap 4 shown in FIG. 19C is used to calculate a set of prediction coefficients that will be applied to generate a B signal at the position of the R signal for the pixel of interest. The class tap 4 is composed of eight pixels. More specifically, it has four B-signal pixels arranged at upper-left, upper-right, lower-left and lower-right positions with respect to the R-signal pixel of interest, respectively. The class tap 4 further has a B-signal pixel arranged above the first B-signal pixel and spaced therefrom by a one-pixel distance, a B-signal pixel arrange to the left of the second B-signal pixel and spaced therefrom by a one-pixel distance, a B-signal pixel arranged below the third B-signal pixel and spaced therefrom by a one-pixel distance, and a B-signal pixel arranged to the right of the fourth B-signal pixel and spaced therefrom by a one-pixel distance.

In the digital still camera 1, the block-generating section 28 extracts a class tap from the pixels that have been extracted by using the above-mentioned class taps 1 to 4, in accordance with the color of the pixel of interest and the color of the pixel generated at the position of the pixel of interest. The ADRC process section 29 performs the ADRC process on the class tap thus extracted, thereby generating characteristic data. Then, the classification process section 30 classifies the characteristic data, generating a class number (class code). The set of prediction coefficients, which corresponds to the class number, is read from the coefficient memory 32. The adaptation process section 31 utilizes the set of prediction coefficients thus read and effects an adaptation process on the pixel of interest, by using the linear combination model expressed by the equation (3). A pixel having a color component different from all color components can, therefore, be generated at the position of the pixel of interest.

As described above, a class tap and a prediction tap are extracted on the basis of the pixel of interest, which is contained in an input image signal. A class code is then generated from the class tap extracted. Further, the set of prediction coefficients corresponding to the class code and the prediction tap extracted are used, generating a R signal, a G signal and a B signal at the position of the pixel of interest. Hence, an image signal of high resolution can be obtained.

Moreover, a student-image signal is generated from a teacher-image signal input, and a class tap is extracted on the basis of the pixel of interest, which is contained in the student-image signal. The pixel value of the teacher-image signal, which is located at the position corresponding to the pixel of interest in the student-image signal, is extracted. A class code is generated from the class tap extracted. The class tap and the pixel value, extracted, are used, thereby calculating a set of prediction coefficients that will be applied to the operation for generating a new color signal at the position of the pixel of interest, which is contained in the student-image signal. The set of prediction coefficients and the class code are stored in a memory, associated with each other. The set of prediction coefficients, thus calculated, can therefore be used in an image-signal processing apparatus that processes image signals to provide images of high resolution.

As described above, the prediction tap the image-signal processing section 8 uses to perform the adaptation process and the class tap the learning apparatus 40 uses to calculate a set of prediction coefficients are of different structures. The prediction tap and the class tap may, nonetheless, be of the same structure. Furthermore, the structures of the prediction tap and class tap are not limited to those described above.

As has been indicated, the color-coding filter 4 is one having a color-filter array of Bayer arrangement. Any other type of a color-coding filter in the present invention can of course replace the filter 4.

FIG. 20A to FIG. 20N show various color-filter arrays that may be used in the color-coding filter 4 incorporated in the CCD image sensor 5 of the digital still camera.

FIGS. 20A to 20G show four color-filer arrays that may be used in the color-coding filter 4, each having green (G) filters, red (R) filters and blue (B) filters.

FIG. 20A shows a Bayer arrangement of color filters. FIG. 20B depicts an in-line arrangement. FIG. 20C shows a G-stripe, RB chessboard arrangement. FIG. 20D shows a G-stripe, RB perfect chessboard arrangement. FIG. 20E illustrates a stripe arrangement. FIG. 20F depicts a slant stripe arrangement. FIG. 20G illustrates a primary color-difference arrangement.

FIGS. 20H to 20N illustrate various arrangements of color-filter arrays which may be used in the color-coding filter 4, each comprising magenta (M) color filters, yellow (Y) color filters, and cyan (C) color filers and white (W) color filters that pass complementary-color components of light. FIG. 20H shows a field color-difference sequence arrangement. FIG. 20I depicts a frame color-difference sequence arrangement. FIG. 20J shows a MOS-type arrangement. FIG. 20K illustrates a modified MOS-type arrangement. FIG. 20L shows a frame interleave arrangement. FIG. 20M depicts a field interleave arrangement. FIG. 20N shows a strip arrangement.

The complementary color components (M, Y, C, W and G) are defined as follows:

$Y=G+R$ $M=R+B$ $C=G+B$ $W=R+G+B$

The color components (YM, YG, CM and CG) of light that pass through the color-coding filter 4 of the frame color-difference sequence arrangement, shown in FIG. 201, are given as:

$YM=Y+M=2R+G+B$ $CG=C+G=2G+B$ $YG=Y+G=R+2G$ $CM=C+M=R+G+2R$

The image signal generated by performing the adaptation process on an image signal output from the CCD of a single-plate camera and equivalent to an image signal output from the CCD of a three-plate camera represents an image more sharp than an image represented by an image signal generated by the conventional linear interpolation. Hence, if the image signal is further subjected to interpolation to provide an image in density four times as high, the resultant image will have a sufficient sharpness. For example, an image signal showing n.times.m R pixels, an image signal representing n.times.m G pixels and an image signal showing n.times.m B pixels, which are shown in FIG. 21B, are generated by the adaptation process from the image signal output from the CCD image sensor that is composed of n.times.m pixels (n and m are positive integers) as illustrated in FIG. 21A. That is, an image signal equivalent to one output from the CCD of a three-plate camera is generated by means of adaptation process, an image signal for 2n.times.2m R pixel is generated from the signal for n.times.m R pixels by means of prediction process, an image signal for 2n.times.2m B pixels is generated from the signal for n.times.m G pixels by means of prediction process, and an image signal for 2n.times.2m B pixels is generated from the signal for n.times.m B pixels by prediction process. Thus, a sharp image can be obtained in density four times as high.

The image-signal processing section 8 incorporated in the digital still camera 1 can generate an image signal of a higher density (fourfold density in this instance), directly from the output of the CCD image sensor 5 by means of the adaptation process.

The image-signal processing section 8 performs the adaptation process on, for example, an image signal output from the CCD image sensor and composed of n.times.m pixels (n and m are positive integers) shown in FIG. 22A. Thus, the section 8 generates an image signal of n.times.m G pixels, an image signal of n.times.m B pixels, and an image signal of n×m R pixels, as is illustrated in FIG. 22B, directly from the image signal.

In the image-signal processing section 8, the block-generating section 28 divides the input image signal into p.times.q blocks (p and q are positive integers). The ADRC process section 29 extracts a class tap from each block, as will be described below, and performs the ADRC process on the class tap.

Figures 23, 24:
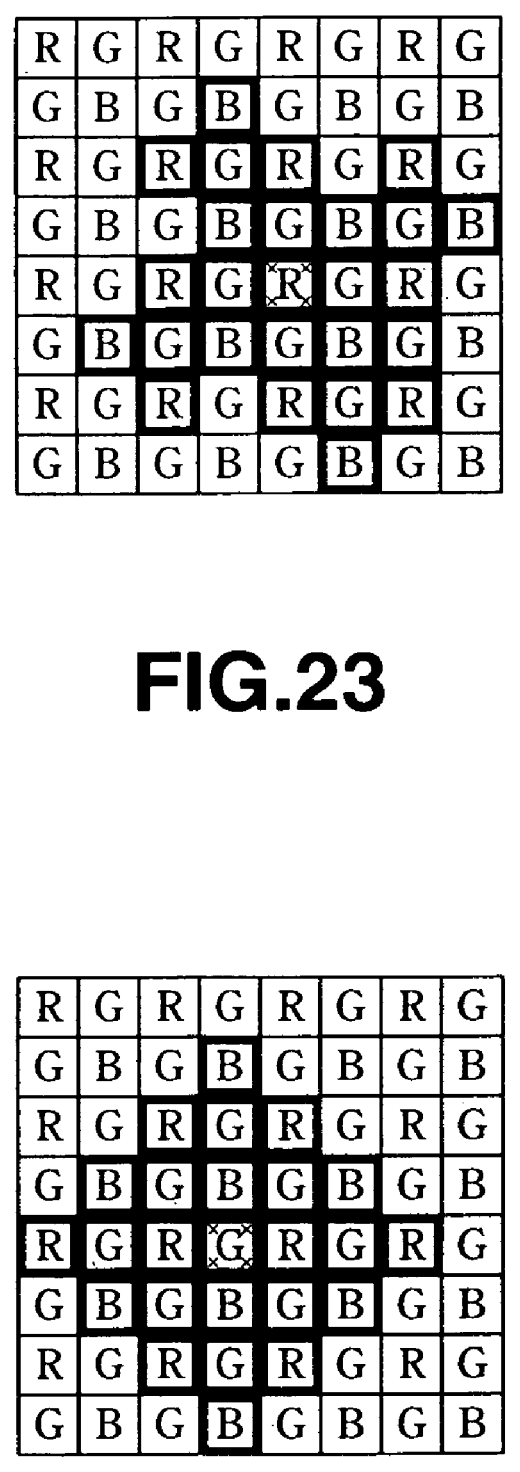

FIGS. 23 to 26 show examples of class taps. These class taps are of the types applied in the case where the color-filter array of the CCD image sensor 5 has the Bayer arrangement. FIG. 23 shows a class tap used to generate R, G and B pixels of fourfold density, around one R pixel. In the figure, marks.times.are added to the pixel that is to be generated, and the class tap is framed with thick lines.

Figures 25, 26:
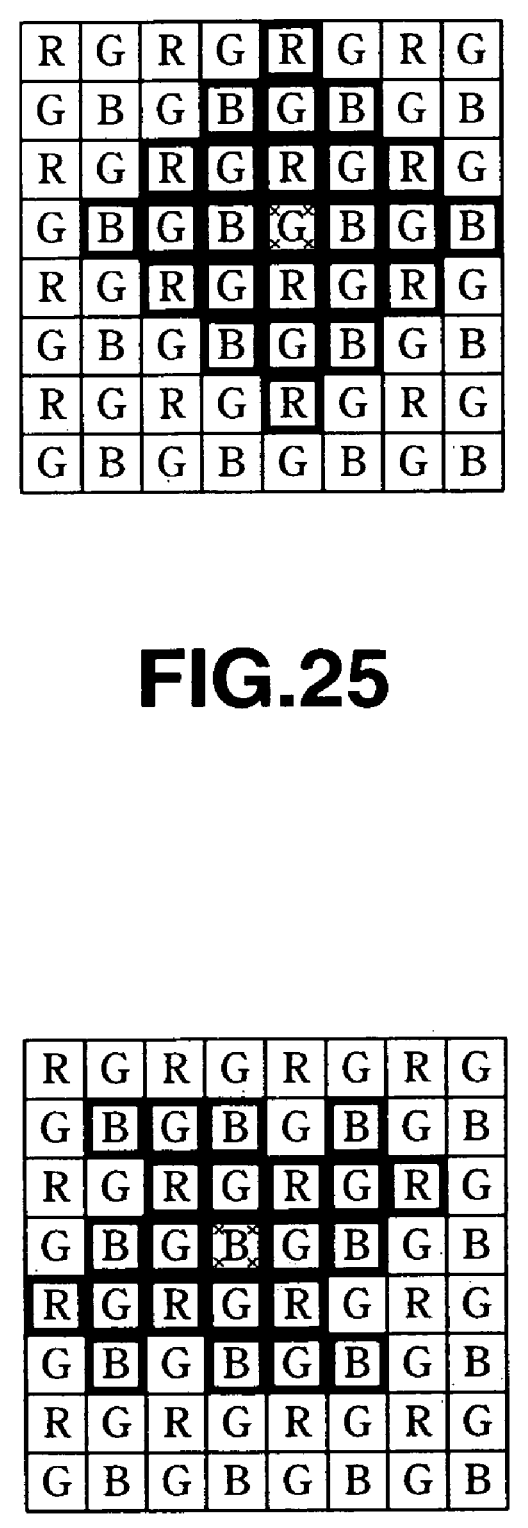

FIGS. 24 and 25 show class taps, each being of the type used to generate R, G and B pixels of fourfold density, around one G pixel. More precisely, the class tap shown in FIG. 24 is applied to generate pixels around a G pixel present in a row in which R pixels exist. The class tap shown in FIG. 25 is used to generate R, G and B pixels of fourfold density, around a G pixel present in a row in which B pixels exist.

FIG. 26 shows a class tap which is used to generate R, G and B pixels of fourfold density, around a B pixel present in a row in which B pixels exist.

In order to generate an image signal representing four pixels surrounding an R pixel, each having R, G or B component, the ADRC process section 29 extracts a class tap that consists of those of 26 pixels framed in FIG. 23 which are of the corresponding colors. The section 29 carries out the ADRC process on the signal values of the R, G and G components of each pixel of the class tap.

In Step S17, the classification process section 30 classifies the signals supplied from the ADRC process section 31. That is, the section 30 determines a class for the those of 26 pixels framed in FIG. 23 which have been extracted and which correspond to the signal values obtained by the ADRC process. The number of the class thus determined is supplied to the adaptation process section 31. In Step S18, the adaptation process section 31 reads from the coefficient memory 32 the set of coefficients which corresponds to the class number supplied from the classification process section 30. The section 31 multiplies the coefficients of the set by the corresponding prediction tap. The resultant products are added together, thereby generating a fourfold-density image signal.

Figures 27, 28:
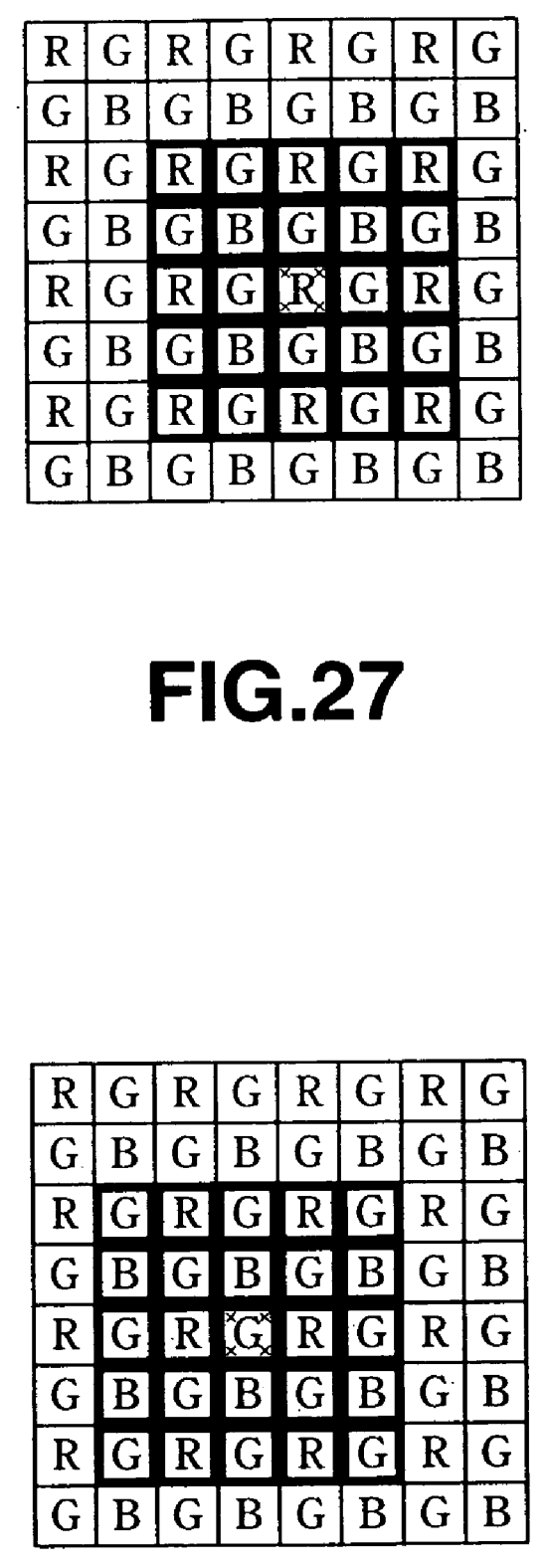
Figures 29, 30:
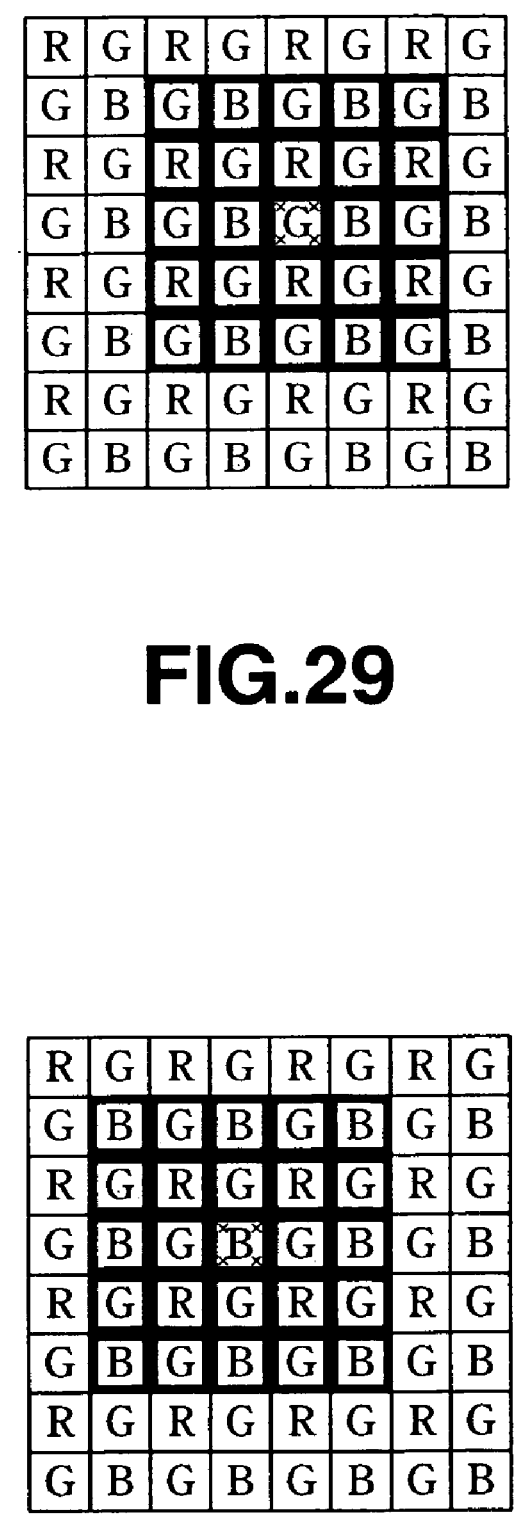

FIGS. 27 to 30 various prediction taps. FIG. 27 shows a prediction tap used to generate four pixels of fourfold density around one R pixel. FIGS. 28 and 29 show prediction taps, each applied to generate four pixels of fourfold density, around one G pixel. To be more specific, FIG. 28 shows a prediction tap used to generate pixels of fourfold density, around a G pixel present in a row in which R pixels exist. FIG. 29 shows a prediction tap used to generate fourfold-density pixels around a G pixel present in a row in which B pixels exist.

FIG. 30 depicts a prediction tap that is used to generate four pixels of fourfold density, around one B pixel.

As clearly seen from FIGS. 27 to 30, any prediction tap used in the present embodiment is composed of 5.times.5 pixels located around the pixel of interest that corresponds to four pixels of fourfold density.

To predict the fourfold-density pixel, which is located at the upper-left position with respect to one R pixel as shown in FIG. 27, the adaptation process section 31 multiplies the prediction coefficients of the set identified by the class number supplied from the classification process section 30, by the prediction tap. The resultant products are added together. Such multiplication and addition are carried out, thus predicting three pixels which are located at the upper-right, lower-left and lower-right positions with respect to the R pixel.

The classification-adaptation process described above generates an image signal composed of 2n.times.2m R pixels, an image signal composed of 2n.times.2m G pixels and an image signal composed of 2n.times.2m B signals, directly from a one-frame image signal consisting of n.times.m pixels (each being a signal representing one color only). This makes it possible to provide an image more sharp than the image represented by an image signal of fourfold density, from an image signal composed of n.times.m R pixels, an image signal composed of n.times.m G pixels and an image signal composed of n.times.m B pixels.

In the learning apparatus 40 converts the fourfold-density image signal to a teacher-image signal. The extraction section 41 performs an extraction process on the input teacher-image signal, so that color filters may be used which have a magnification power inverse to the magnification power the photographing system should have. A student-image signal is thereby generated which corresponds to the image signal output by the image signal output by the CCD image sensor 5 of this single-plate camera. Thus, it is possible to obtain the set of prediction coefficients, described above.

To state it more specifically, in the learning apparatus 40, a student-image signal is generated, in which a prescribed number of sample values representing color components at pixel positions, respectively. A plurality of pixels located near the pixel of interest included in the predicted image signal that has a greater sample value than the student-image signal are extracted from the student-image signal thus extracted and representing a one-frame image. The predicted image signal is classified on the basis of the pixels extracted. Further, a plurality of pixels located near the position of the pixel of interest are extracted from the teacher-image signal which corresponds to the predicted image signal and having color components at the pixel positions. A set of prediction coefficients is thereby generated, for each class, which corresponds to the above-mentioned student-image signal. The set of prediction coefficients, thus generated, will be used in the prediction process to obtain an image signal corresponding to the teacher-image signal.

In order to evaluate the operating efficiency of the embodiment described above, simulation was conducted on nine high-vision images of the ITE (Institute of Television Engineers) standard, using a color-filter array of the Bayer arrangement. Further, the nine high-vision images were used, also to calculate a set of prediction coefficients.

An image signal equivalent to an output of the CCD of a three-plate camera was subjected to an extraction operation in which the magnification of the classification-adaptation process was applied and the positional relation of pixels was taken into account. An image signal equivalent to an output of the CCD of a single-plate camera was thereby generated. The output of the CCD of the single-plate camera was converted to an image signal having twice as many pixels in both the low direction and the column direction, by means of a classification-adaptation process in which the set of prediction coefficients for the CCD output was utilized. The class tap and prediction tap, used in the classification-adaptation process, were those illustrated in FIG. 23 to FIG. 30. The R, G and B pixels of the class tap are processed independently of one another, whereas the R, G and B pixels of the prediction tap are mixed and used.

The simulation resulted in an image signal that was sharp at edges and fine parts and exhibited a high resolution. The image signal was more sharp and had a higher resolution than a fourfold-density image signal generated from an output of the CCD of a single-plate camera (FIG. 21A) or from an output of the CCD of a single-plate camera (FIG. 21B). Simulation was conducted by means of linear interpolation, too. The image signal generated by classification process was found superior to the image signal provided by linear interpolation in terms of resolution and S/N ratio.

In the embodiment described above, the output of the single-plate CCD image sensor is converted to a fourfold-density image signal. Nevertheless, the present invention can be applied to generate an image signal of any other density.

Moreover, the present invention can be applied not only to a digital still camera, but also to a video camera and any other type of an image-processing apparatus.

Various types of color-filter arrays are available, which can be used as the color-coding filter 4 provided in the CCD image sensor 5 of the digital still camera 1 described above. One signal value may represent more or less information than another signal value in the color-filter array. In this case, the precision of the prediction process will vary if the color signals are subjected, one by one, to the classification-adaptation process. If the color-filter array used is, for example, of the Bayer arrangement and if the classification-adaptation process is performed on the R, G and B signals, independently of one another, the R signal and the B signal will be processed in the same way as the G signal (two existing in every four pixels), though one R signal and one B signal exist in every four pixels. As a consequence, the precision of the prediction process is lower for the R and B signals than for the G signal.

Thus, if one signal value may represent more or less information than another signal value, the color component arranged in a higher density than any other color component is applied to extract a plurality of pixels for the pixel of interest of the input image signal, which has any one of the color components. The pixels extracted are those which have a color component of higher density than any other color component and which are located near the pixel of interest. The class of the input image signal is determined from the pixels thus extracted. On the basis of the class determined, a pixel having a color component different from the color component the pixel of interest has. The precision of the prediction process can thereby be enhanced.

Figures 31, 32:
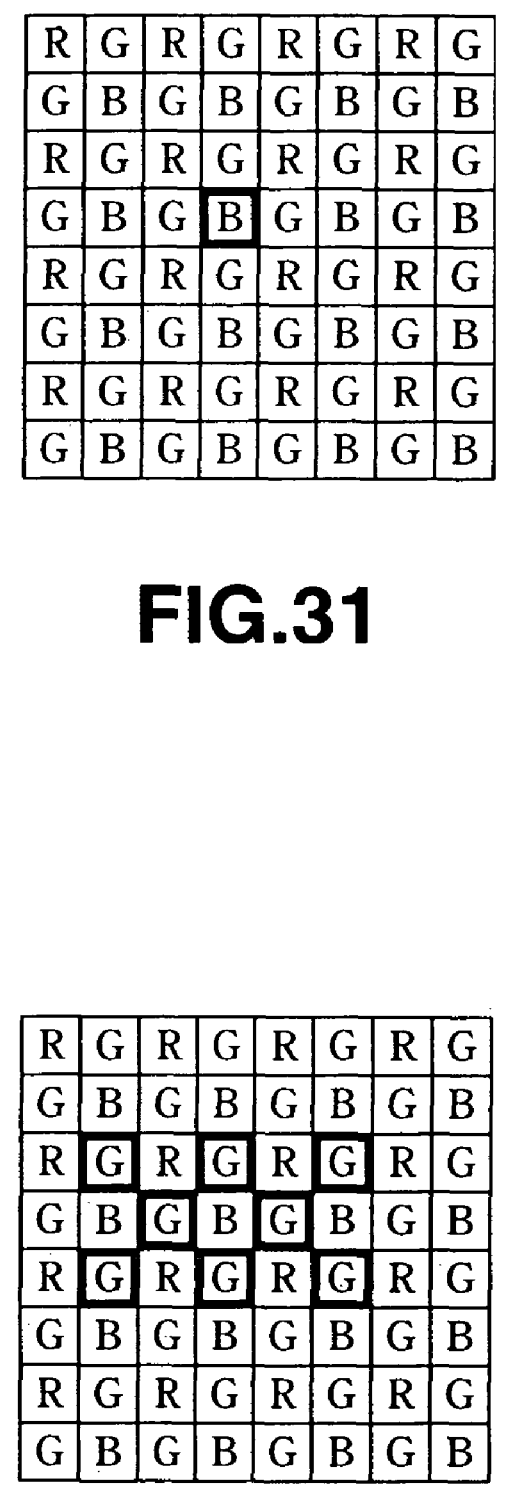

The class tap and the prediction tap, which are applied to the image signal subjected to color coding in the color-filter array of the Bayer arrangement, will be described in detail. As shown in FIG. 31, for example, a B pixel may be the pixel to be predicted. Then, as shown in FIG. 32, the class tap is composed of eight G pixels. Of these eight G pixels, four are arranged above, below, to the left of and to the right of, the pixel to be predicted, respectively. Two are arranged at upper-left and lower-left positions with respect to the G pixel on the left of the pixel to be predicted, and the remaining two are arranged at upper-right and lower-right positions with respect to the G pixel on the right of the pixel to be predicted. In this case, the prediction tap is composed of 5.times.5 pixels, including R pixels, G pixels and B pixels, as illustrated in FIG. 33, with a B pixel located at the center of the 5.times.5 matrix.

Figures 33, 34:
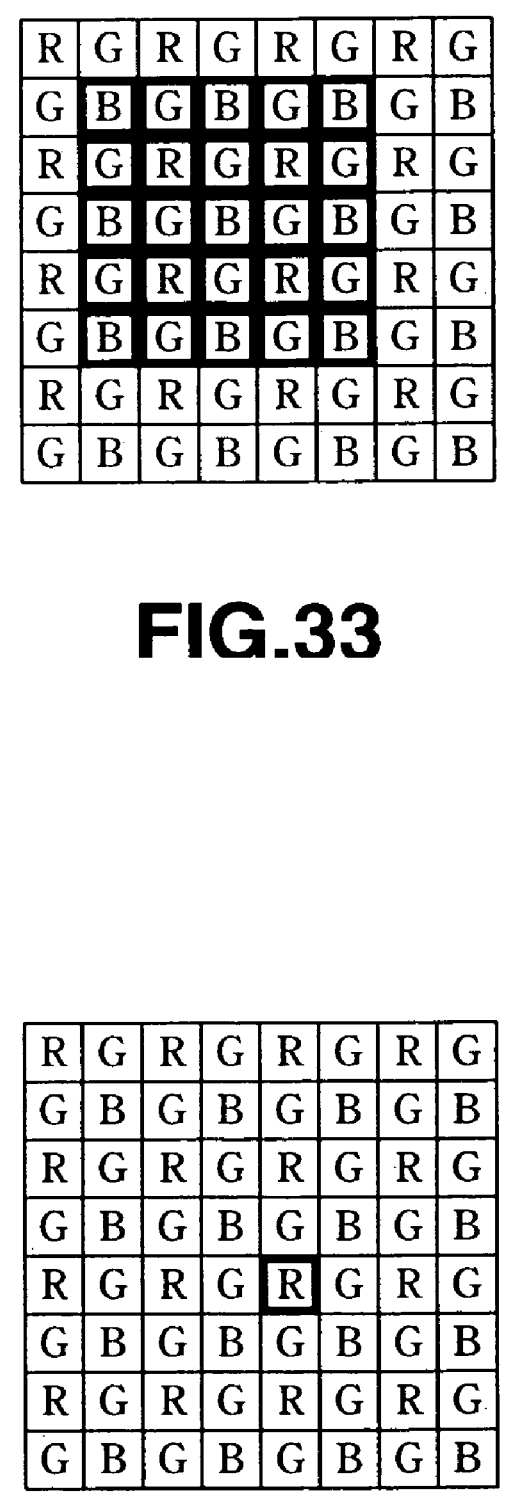
Figures 35, 36:
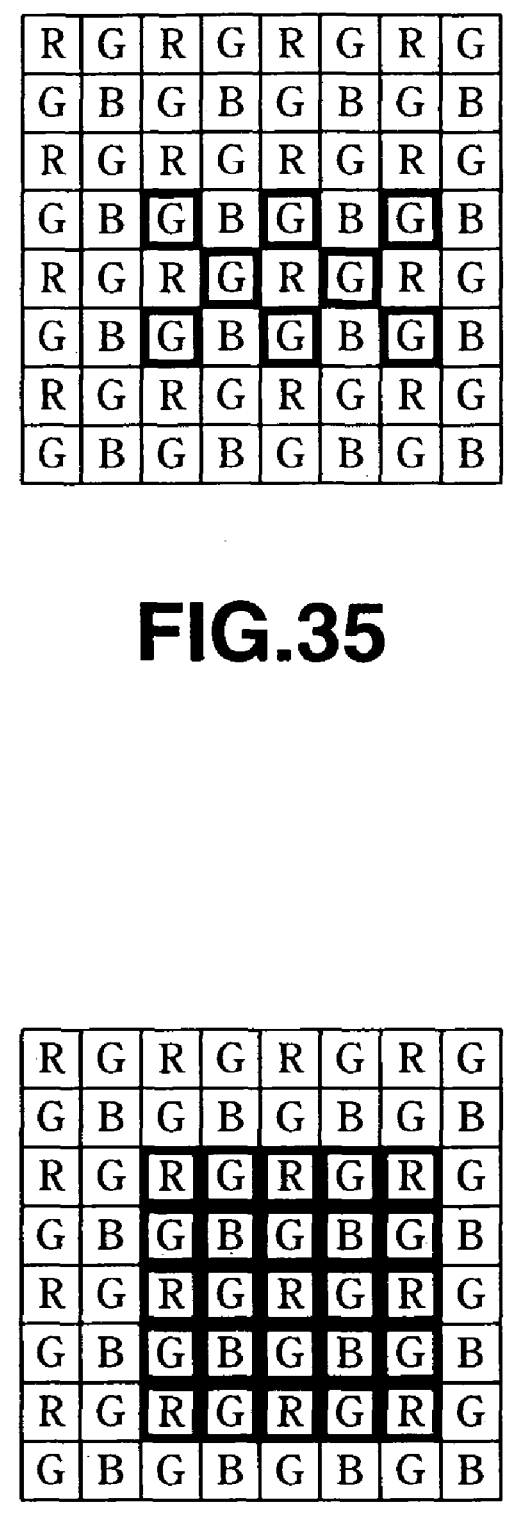

An R pixel may be the pixel to be predicted as is illustrated in FIG. 34. In this case, the class tap is composed of eight G pixels as shown in FIG. 35. Of these eight G pixels, four are arranged above, below, to the left of and to the right of, the R pixel to be predicted, respectively. Two are arranged at upper-left and lower-left positions with respect to the G pixel on the left of the pixel to be predicted, and the remaining two are arranged at upper-right and lower-right positions with respect to the G pixel on the right of the pixel to be predicted. The prediction tap in this case is composed of 25 pixels, including R pixels, G pixels and B pixels, as illustrated in FIG. 35, with an R pixel located at the center of the 5.times.5 matrix.

Figures 38A, 38B:
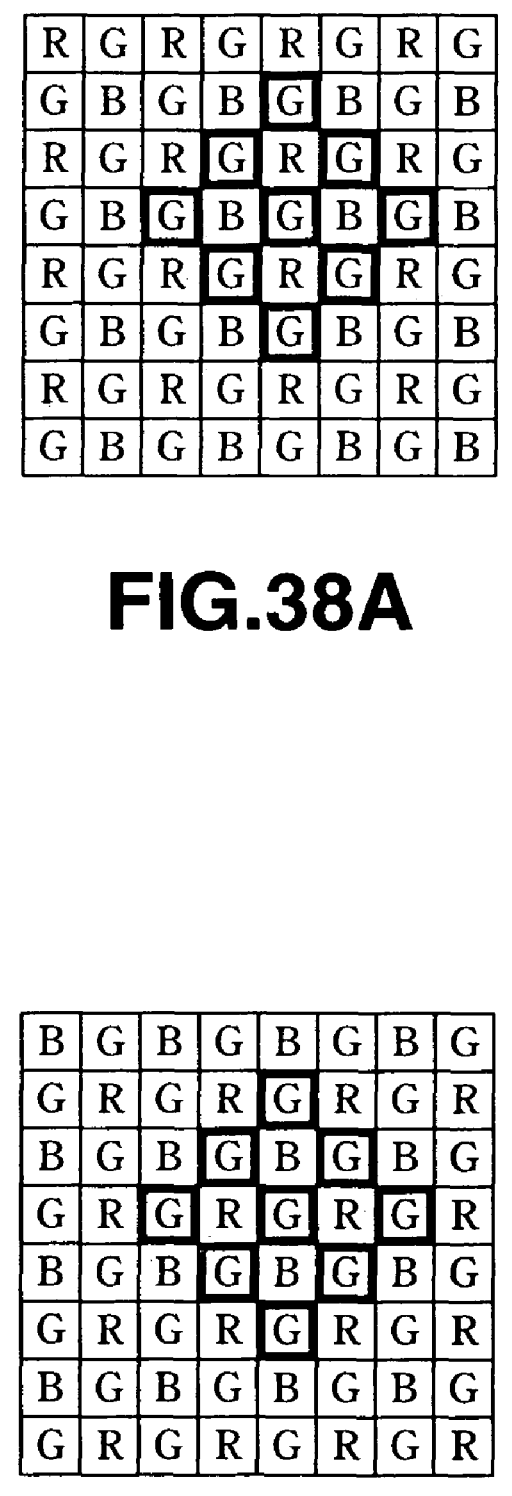
Figures 39A, 39B:
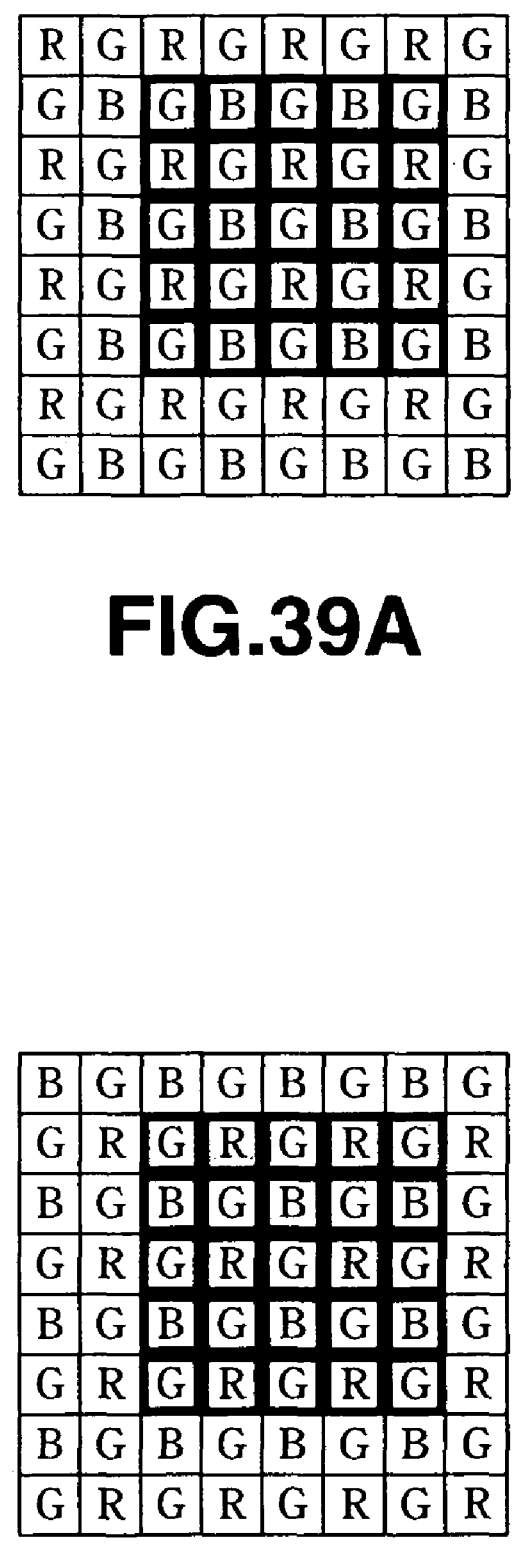

Further, a G pixel may be the pixel to be predicted as is illustrated in FIG. 37. In this case, the class tap is composed of nine G pixels as shown in FIG. 38A or FIG. 38B, in accordance with the colors of the pixels located near the pixel to be predicted. More precisely, the class tap shown in FIG. 38A is composed of the G pixel to be predicted, four G pixels arranged above, below, to the left of and to the right of, the G pixel to be predicted, respectively, two G pixels arranged above and blow the G pixel to be predicted and spaced therefrom by a R pixel, and two G pixels arranged to left and right of the G pixel to be predicted and spaced therefrom by a B pixel. The class tap shown in FIG. 38B is composed of the G pixel to be predicted, four G pixels arranged above, below, to the left of and to the right of, the G pixel to be predicted, respectively, two G pixels arranged above and blow the G pixel to be predicted and spaced therefrom by a B pixel, and two G pixels arranged to left and right of the G pixel to be predicted and spaced therefrom by an R pixel. The prediction tap in this case is composed of 5.times.5 pixels, including R pixels, G pixels and B pixels, as illustrated in FIG. 39A or FIG. 39B, with a G pixel used as the pixel to be predicted.

A luminance signal Y is generated from the signal values for R, G and B, as in indicated by the following equation:

$$Y=0.59G+0.30R+0.11B$$

As seen from this equation, the G component more influences the luminance signal Y than the other color components. Therefore, as shown in FIG. 31, G pixels are arranged more densely than the R pixels and the B pixels in the Bayer arrangement. The luminance signal Y contains a great amount of information that influences the characteristic of human visual sense and the image resolution.

In view of this, it may be possible to effect the classification-adaptation process with higher precision if the class tap is composed of only G pixels of the image signal.

To this end, the learning apparatus 40 extracts a plurality of pixels which are located near the pixel of interest of a student-image signal having at each pixel position, a color component representing any one of the colors and which have a color component more dense than any other color components. The class of the input image signal is determined from the pixels thus extracted. Thus, it is possible to obtain a set of prediction coefficients that can be applied to accomplish the adaptation process described above.

To evaluate the operating efficiency of the embodiment described above, simulation was conducted on nine high-vision images of the ITE (Institute of Television Engineers) standard, using a color-filter array of the Bayer arrangement. Further, the nine high-vision images were used to calculate a set of prediction coefficients. An image signal equivalent to an output of the CCD of a three-plate camera was subjected to an extraction operation in which the magnification of the classification-adaptation process was applied and the positional relation of pixels was taken into account. An image signal equivalent to an output of the CCD of a single-plate camera was thereby generated. A set of prediction coefficients was generated by applying algorithm similar to the one that is used in the learning apparatus 40. Further, the output of the CCD of the single-plate camera was converted to an image signal having twice as many pixels in both the low direction and the column direction, by means of the classification-adaptation described above. The simulation resulted in an image signal that was more sharp at edges and had a higher resolution than in the case where the class tap applied to predict an R pixel (alternatively, a G signal or a B signal) is a pixel that has R, G and B components mixed together. Simulation was conducted by means of linear interpolation, not classification-adaptation process. The image signal generated by classification process was found superior to the image signal provided by linear interpolation in terms of resolution and S/N ratio.

The R, G and B signals representing three standard images A, B and C, which were obtained by classification-adaptation process in which R, G and B pixels were extracted independently as class taps, exhibited the following S/N ratios:

Standard Image A
R:35.22 db
G:35.48 db
B:34.93 db
Standard Image B
R:32.45 db
G:32.40 db
B:29.29 db Standard Image C
R:24.75 db
G:25.31 db
B:23.23 db By contrast, the R, G and B signals representing three standard images A, B and C, which were obtained by classification-adaptation process in which a G pixel was used as a class tap, exhibited the following S/N ratios:

Standard Image A
R:35.38 db
G:35.48 db
B:35.13 db
Standard Image B
R:32.60 db
G:32.40 db
B:29.46 db
Standard Image C
R:24.99 db
G:25.31 db
B:23.79 db As indicated above, only the pixel of the color component, which is more densely arranged than any other pixels, is used as a class tap in the case where the signal values represent different amounts of data. The precision of prediction can thereby be enhanced.

Moreover, the class of input image signal may be classified in accordance with the results of the ADRC process performed on the class tap including a plurality of color signals extracted for each color of the color-filter array. In this case, the prediction process can be accomplished with a higher precision. Image signals of high resolution can therefore be generated.

A plurality of pixels located near the pixel of interest are extracted for each pixel position, from the input image signal generated by the CCD image sensor of the single-plate camera. An ADRC process is then effected, thereby generating characteristic data. The characteristic data is used as the space activity of the pixels of each color component, which have been extracted. The class of the image signal is determined from the characteristic data. In accordance with the class thus determined, the prediction-process section 25 performs classification-adaptation process, thereby generating-a pixel having a color component different from that of the pixel of interest, at the position of the pixel of interest. An image signal equivalent to an output of the CCD of a three-plate camera can therefore be obtained.

That is, the classification process section 30 receives the output of the ADRC process section 29, i.e., an re-quantized code, and classifies the space activity, i.e., the level-distribution pattern of the image signal. The section 30 generates a class number that represents the results of the classification. The space activity is classified more appropriately, which helps to raise the precision of the prediction process.

The class tap and the prediction tap applied to the image signal color-coded by the color-filter array of Bayer arrangement will be described in detail.

Figures 40A, 40B, 40C:
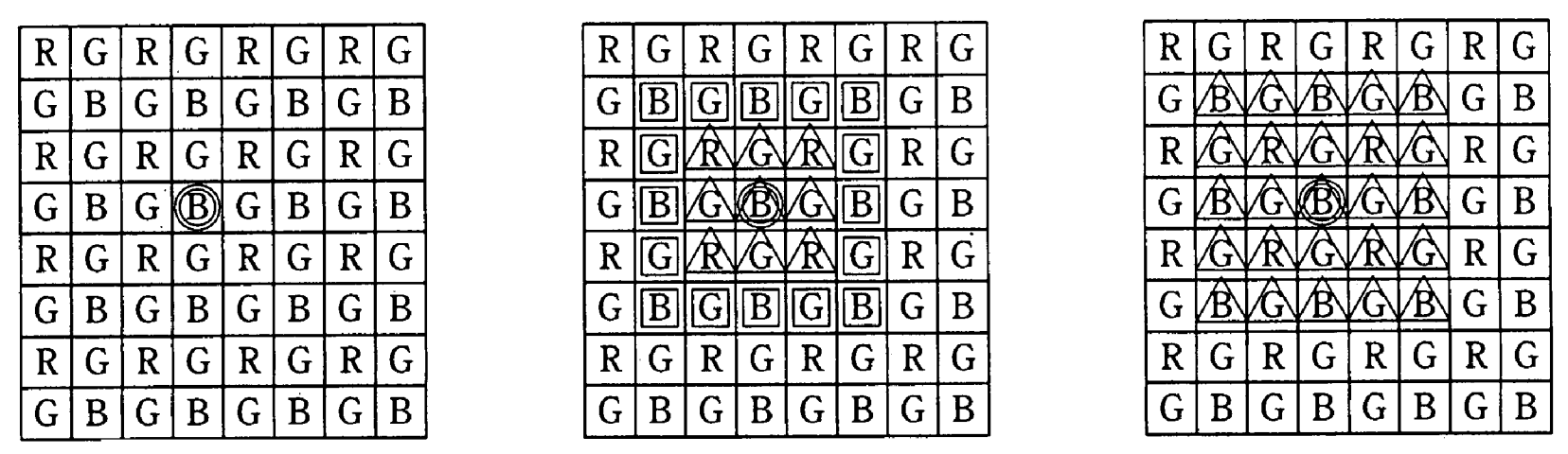

FIGS. 40A, 40B and 40C illustrate a tap that serves to generate an R signal, a G signal and a B signal at the position of a B pixel (an image signal having a B component, too, will be generated at the position of the B pixel).

Figures 41A, 41B, 41C, 42:
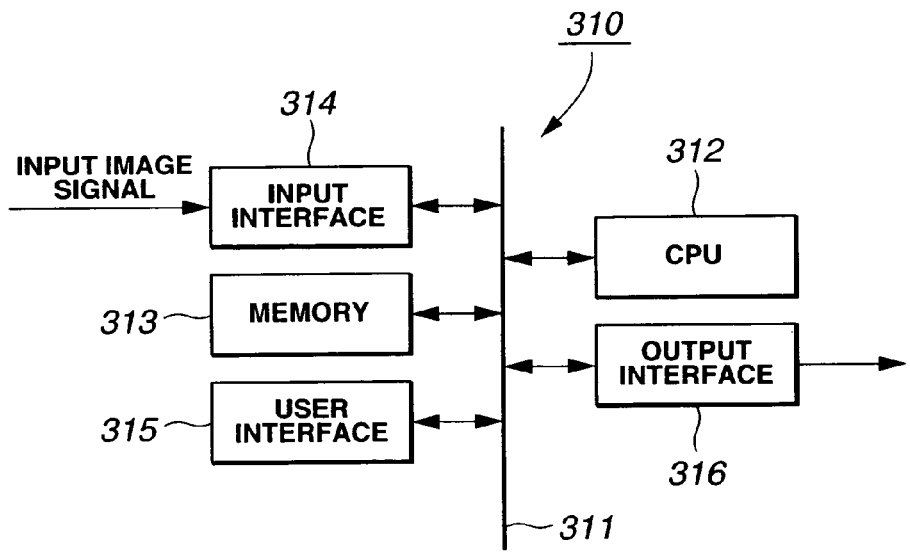
FIGS. 41A, 41B and 41C show a tap of still another type.
FIG. 42 is a block diagram of a computer system.

FIGS. 41A, 41B and 41C show that serves to generate an R signal, a G signal and a B signal at the position of a G pixel (an image signal having a B component, too, will be generated at the position of the B pixel). In FIGS. 40A to 40C and FIGS. 41A to 41C, the double circle indicates the pixel to be predicted. In other words, the double circle indicates the position of the pixel to be predicted. In FIGS. 40G and 41B, the triangles represent the pixels to be extracted to constitute a class tap, or the positions thereof In FIGS. 40G and 41B, the triangles indicate the positions of the pixels to be extracted to form a prediction tap.

To generate an R signal, a G signal and a B signal at the position of a B pixel as is illustrated in FIG. 40A, the pixels specified in FIG. 40B are extracted and used as a class tap. The class tap is composed of nine pixel (indicated by the triangles), i.e., the pixel to be predicted and the eight pixels surrounding the pixel to be predicted. Since the class tap includes only one G pixel, the characteristic data to be used to achieve classification by means of the ADRC process cannot be extracted reliably. Nonetheless, more pixels than the pixels actually used as a class tap are subjected to the ADRC process, making it possible to extract the characteristic data without fail.

The class tap is extracted as is shown in FIG. 40C. More specifically, the pixels at which R, G and B components will be mixed are extracted as a class tap. The set of prediction coefficients, provided for the class, are applied in weighting process, addition process and the like, thereby predicting an image signal at the position predicted.

In the case of the Bayer arrangement, the number of pixels for each R signal, the number of pixels for each G signal and the number of pixels for each B signal are 1, 2 and 1, respectively. Hence, a class tap and prediction tap of the same structures as those applied to predict and generate the R, G and B signals at the position of the R pixel can be utilized to predict and generate an R signal, a G signal and a B signal at the position of the R pixel.

To generate an R signal, a G signal and a B signal at the position of a G pixel as is illustrated in FIG. 41A, the pixels specified in FIG. 41B are extracted and used as a class tap. The class tap is composed of nine pixel (indicated by the triangles), i.e., the pixel to be predicted and the eight pixels surrounding the pixel to be predicted. For any color signal having a small number of pixels, the class tap is expanded to include those pixels that are indicated by squares in FIG. 41B. An ADRC process is performed on the signals of the class tap. Only the central pixel is extracted from the results of the ADRC process, thereby achieving classification. Furthermore, a process is effected to apply the relation between the R, G and B pixels to the results of the classification. For example, the dynamic range of the ADRC process performed on each signal, the results of threshold process, the maximum and minimum dynamic ranges of the ADRC process, and the like are added to the image signal, in the form of data items consisting of several bits. An image signal can thereby be predicted with high precision and generated, which represents a high-resolution image.

A prediction tap is extracted as shown in FIG. 41C. More precisely, the pixels at which R, G and B components will be mixed are arranged as a class tap. The set of prediction coefficients, provided for the class, are applied in weighting process, addition process and the like, thereby predicting an image signal at the position predicted.

To evaluate the operating efficiency of the embodiment described above, simulation was conducted on the assumption that a color-filter array of the Bayer arrangement is utilized. In the simulation, a set of prediction coefficients was generated by applying algorithm similar to the one that is used in the learning apparatus 40. Further, an extraction process was carried out, generating an image signal equivalent to an output of the CCD of a single-lens camera, from an image signal equivalent to an output of the CCD of a three-plate camera. Still further, a prediction process was implemented in the above-mentioned classification-adaptation process. Moreover, simulation was conducted by means of linear interpolation and by means of the classification-adaptation process according to the invention. In the classification-adaptation process, R, G and B pixels were classified independently of one another. The results of the linear interpolation were compared with the results of the classification-adaptation process.

More specifically, the simulation was conducted on nine high-vision images of the ITE (Institute of Television Engineers) standard. The nine high-vision images were used, also to calculate a set of prediction coefficients. The simulation resulted in an image signal that was sharper at edges and fine parts than the image signal generated by the linear interpolation. In addition, it was confirmed that the S/N ratio had improved. Moreover, the resolution of any images represented by R- and B-component image signals was higher than in the case where the classification-adaptation process was effected on the R, G and B image signals independently. Thus, the embodiment of the present invention can provide images that are superior, in terms of the sharpness of edges and fine parts, S/N ratio, resolution and the like, to those provided by the linear interpolation or by classification-adaptation process wherein the R, G and B signals are classified independently.

Neither the class tap nor the prediction tap is limited to those shown in FIGS. 40A to 40C and FIGS. 41A to 41C. Rather, the class tap and the prediction tap may be changed in accordance with the arrangement of the primary-color filter array or complementary-color filter array, the characteristics (e.g., resolution of the image signal to be generated, and the like. For example, more pixels may be extracted to constitute a class tap or a prediction tap if it is demanded that an image of higher resolution be output.

As FIGS. 20A to 20N show, various types of color-filter arrays are available for the color-coding filter 4 incorporated in the CCD image sensor 5 of the single-plate camera. The method described above is effective and useful to color-filter array in which the information items represented by signal values differ in density.

The present invention can be applied, also to the case where an output of the CCD image sensor is converted to an image signal having a resolution different from that of the CCD image sensor, for example by increasing the pixels of each row and column of the CCD image sensor as shown in FIG. 22A or FIG. 22B, thus enhancing the resolution four times. That is, a learning process may be effected, using the image signal to be generated as a teacher-image signal and the image signal output from the CCD image sensor 5 incorporated in the digital still camera 1, thereby generating a set of prediction coefficients. The prediction coefficients, thus generated, may then be applied to the classification-adaptation process.

The present invention can be applied to not only digital still cameras, but also movie cameras such as camera-incorporated VTRs, and image-processing apparatus. Further, the invention can be applied to printers, scanners, and the like.

The classification-adaptation process performed by the prediction-process section 25 and the learning process performed by the learning apparatus 40 may be accomplished by an ordinary computer system 310 shown in FIG. 43. As shown in FIG. 43, the computer system 310 comprises a bus 311, a CPU (Central Processing Unit) 312, a memory 313, an input interface 314, a user interface 315, and an output interface 316. The computer program that implements these processes is recorded in a recording medium. The computer program controls the computer, thereby processing input image signals, each representing a color component at one pixel. The recording medium storing this program is presented to users, in the form of a magnetic disk, a CD-ROM or the like. Moreover, the program can be transmitted to users through networks such as the Internet and digital-communications satellites.

The invention claimed is:

1. An image-signal processing apparatus for processing an input image signal at a position of each pixel, said input image signal having any one of various color components, said apparatus comprising:
    extraction means for extracting a plurality of pixels located near each pixel of interest of the input image signal;
    class-determining means for determining a class from the pixels extracted by the extraction means; and
    pixel-generating means for generating a pixel at a position of the pixel of interest in accordance with the class determined by the class-determining means, said pixel having a color component which is not the color component of the pixel of interest.

2. The image-signal processing apparatus according to claim 1, characterized in that the pixel-generating means generates a pixel having all color components at the position of the pixel of interest.

3. The image-signal processing apparatus according to claim 1, characterized in that the pixel-generating means comprises storage means for storing a set of prediction coefficients for each class and operation means for performing an operation on a set of prediction coefficients which corresponds to the class determined by the class-determining means and the pixels located near the pixel of interest which have been extracted by the extraction means, thereby to generate a pixel having a color component different from at least the color component of the pixel of interest.

4. The image-signal processing apparatus according to claim 3, characterized in that the operation means performs an operation on a linear combination of the set of prediction coefficients and the values of the pixels located near the pixel of interest.

5. The image-signal processing apparatus according to claim 3, characterized in that the extraction means extracts at least one different pixel and supplies the same to the class-determining means and the operation means.

6. The image-signal processing apparatus according to claim 1, characterized in that the color component represents a color of red, blue or green.

7. The image-signal processing apparatus according to claim 1, characterized by further comprising acquisition means for acquiring an image signal having a pixel at each pixel position, said pixel having one of various color components.

8. The image-signal processing apparatus according to claim 7, characterized in that the acquisition means is a solid-state imaging element.

9. The image-signal processing apparatus according to claim 8, characterized in that the solid-state imaging element is a CCD image sensor of the Bayer arrangement.

10. An image-signal processing method of processing an input image signal at a position of each pixel, said input image signal having any one of various color components, said method comprising the steps of:
    extracting a plurality of pixels located near each pixel of interest of the input image signal;
    determining a class from the pixels extracted in the extraction step; and
    generating a pixel at a position of the pixel of interest in accordance with the class determined in the class-determining step, said pixel having a color component which is not the color component of the pixel of interest.

11. The image-signal processing method according to claim 10, characterized in that a pixel having all color components is generated at the position of the pixel of interest, in the pixel-generating step.

12. The image-signal processing method according to claim 10, characterized in that in the pixel-generating step, operation means performs an operation on a set of prediction coefficients which corresponds to the class determined in the class-determining step and the pixels located near the pixel of interest which have been extracted in the extraction step, thereby to generate a pixel having the different color component.

13. The image-signal processing method according to claim 12, characterized in that in the pixel-generating step, an operation is performed on a linear combination of the set of prediction coefficients and the values of the pixels located near the pixel of interest.

14. The image-signal processing method according to claim 12, characterized in that in the extracting step, at least one different pixel is extracted for use in the class-determining step and the pixel-generating step.

15. The image-signal processing method according to claim 10, characterized in that the color component represents a color of red, blue or green.

16. The image-signal processing method according to claim 10, characterized by further comprising an acquisition step of acquiring an image signal having a pixel at each pixel position, said pixel having one of various color components.

17. The image-signal processing method according to claim 16, characterized in that in the acquisition step, a solid-state imaging element acquires the image signal.

18. The image-signal processing method according to claim 17, characterized in that in the acquisition step, a CCD image sensor of the Bayer arrangement acquires the image signal.

19. A non-transitory computer-readable medium storing a computer program designed to process an input image signal at a position of each pixel, said input image signal having any one of various color components, said computer program performing the steps comprised of:
    extracting a plurality of pixels located near each pixel of interest of the input image signal;
    determining a class from the pixels extracted in the extraction step; and
    generating a pixel at a position of the pixel of interest in accordance with the class determined in the class-determining step, said pixel having a color component which is not the color component of the pixel of interest.

20. The non-transitory medium according to claim 19, characterized in that a pixel having all color components is generated at the position of the pixel of interest, in the pixel-generating step.

21. The non-transitory medium according to claim 19, characterized in that in the pixel-generating step, operation means performs an operation on a set of prediction coefficients which corresponds to the class determined in the class-determining step and the pixels located near the pixel of interest which have been extracted in the extraction step, thereby to generate a pixel having the different color component.

22. The non-transitory medium according to claim 21, characterized in that in the pixel-generating step, an operation is performed on a linear combination of the set of prediction coefficients and the values of the pixels located near the pixel of interest.

23. The non-transitory medium according to claim 21, characterized in that in the extraction step, at least one different pixel is extracted for use in the class-determining step and the pixel-generating step.

24. The non-transitory medium according to claim 19, characterized in that the color component represents a color of red, blue or green.

25. The non-transitory medium according to claim 19, characterized in the computer program further comprises an acquisition step of acquiring an image signal having a pixel at each pixel position, said pixel having one of various color components.

26. The non-transitory medium according to claim 25, characterized in that in the acquisition step, a solid-state imaging element acquires the image signal.

27. The non-transitory medium according to claim 26, characterized in that in the acquisition step, a CCD image sensor of the Bayer arrangement acquires the image signal.

28. An image-signal processing apparatus for processing an input image signal, said input image signal having a prescribed number of sample values which constitute one image and each of which represents any one of various color components at each pixel, said apparatus comprising:
extraction means for extracting a plurality of pixels located near each pixel of interest of the input image signal;
class-determining means for determining a class from the pixels extracted by the extraction means; and
output image-signal generating means for generating an output image signal having more sample values than the prescribed number, for the various color components including a color component which is not the color component of the pixel of interest, by processing each pixel of the input image signal in accordance with the class determined by the class-determining means.

29. The image-signal processing apparatus according to claim 28, characterized in that the output image-signal generating means comprises storage means for storing a set of prediction coefficients for each class and operation means for performing an operation on a set of prediction coefficients which corresponds to the class determined by the class-determining means and the pixels located near the pixel of interest which have been extracted by the extraction means, thereby to generate the output image signal.

30. An image-signal processing method of processing an input image signal, said input image signal having a prescribed number of sample values which constitute one image and each of which represents any one of various color components, said method comprising the steps of:
extracting a plurality of pixels located near each pixel of interest of the input image signal;
determining a class from the pixels extracted in the extraction step; and
generating step of generating an output image signal having more sample values than the prescribed number, for the various color components including a color component which is not the color component of the pixel of interest, by processing each pixel of the input image signal in accordance with the class determined in the class-determining step.

31. The image-signal processing method according to claim 30, characterized in that in the output image-signal generating step, an operation is performed on a set of prediction coefficients which corresponds to the class determined in the class-determining step and the pixels located near the pixel of interest which have been extracted in the extraction step, thereby to generate the output image signal.

32. A non-transitory computer-readable medium storing a computer program designed to process an input image signal, said input image signal having a prescribed number of sample values which constitute one image and each of which represents any one of various color components, said computer program performing the steps comprised of:
extracting a plurality of pixels located near each pixel of interest of the input image signal;
determining a class from the pixels extracted in the extraction step; and
generating step of generating an output image signal having more sample values than the prescribed number, for the various colors color components including a color component which is not the color component of the pixel of interest, by processing each pixel of the input image signal in accordance with the class determined in the class-determining step.

33. The non-transitory medium according to claim 32, characterized in that in the output image-signal generating step, an operation is performed on a set of prediction coefficients which corresponds to the class determined in the class-determining step and the pixels located near the pixel of interest which have been extracted in the extraction step, thereby to generate the output image signal.

34. An image-signal processing apparatus for processing an input image signal at a position of each pixel, said input image signal having any one of various color components, said apparatus comprising:
extraction means for extracting a plurality of pixels located near each pixel of interest of the input image signal, each pixel having a color component of the highest density of all color components;
class-determining means for determining a class from the pixels extracted by the extraction means; and
pixel-generating means for generating a pixel in accordance with the class determined by the class-determining means, said pixel having a color component which is not the color component of the pixel of interest.

35. The image-signal processing apparatus according to claim 34, characterized in that the pixel-generating means comprises storage means for storing a set of prediction coefficients for each class and operation means for performing an operation on a set of prediction coefficients which corresponds to the class determined by the class-determining means and the pixels located near the pixel of interest which have been extracted by the extraction means, thereby to generate the pixel having the different color component.

36. The image-signal processing apparatus according to claim 34, characterized in that the pixel-generating means generates a pixel having all color components at the position of the pixel of interest.

37. An image-signal processing method of processing an input image signal at a position of each pixel, said input image signal having any one of various color components, said method comprising the steps of:
extracting a plurality of pixels located near each pixel of interest of the input image signal, each pixel having a color component of the highest density of all color components;
determining a class from the pixels extracted in the extraction step; and
generating a pixel in accordance with the class determined in the class-determining step, said pixel having a color component which is not the color component of the pixel of interest.

38. The image-signal processing method according to claim 37, characterized in that in the pixel-generating step, an operation is performed on a set of prediction coefficients which corresponds to the class determined in the class-determining step and the pixels located near the pixel of interest which have been extracted in the extraction step, thereby to generate the pixel having the different color component.

39. The image-signal processing apparatus according to claim 37, characterized in that in the pixel-generating step, a pixel having all color components is generated at the position of the pixel of interest.

40. A non-transitory computer-readable medium storing a computer program designed to process an input image signal at a position of each pixel, said input image signal having any one of various color components, said computer program performing the steps comprised of:
  extracting a plurality of pixels located near each pixel of interest of the input image signal, each pixel having a color component of the highest density of all color components;
  determining a class from the pixels extracted in the extraction step; and
  generating a pixel in accordance with the class determined in the class-determining step, said pixel having a color component which is not the color component of the pixel of interest.

41. The non-transitory medium according to claim 40, characterized in that in the pixel-generating step, an operation is performed on a set of prediction coefficients which corresponds to the class determined in the class-determining step and the pixels located near the pixel of interest which have been extracted in the extraction step, thereby to generate the pixel having the different color component.

42. The non-transitory medium according to claim 40, characterized in that in the pixel-generating step, a pixel having all color components is generated at the position of the pixel of interest.

43. An image-signal processing apparatus for processing an input image signal at a position of each pixel, said input image signal having any one of various color components, said apparatus comprising:
  extraction means for extracting a plurality of pixels for each color component, from pixels located near each pixel of interest of the input image signal;
  class-determining means including a characteristic-data generating section for generating characteristic data about the pixels of each color component, from the pixels of each color component which have been extracted by the extraction means, and a class-determining section for determining a class from the characteristic data generated for each color component; and
  pixel-generating means for generating a pixel in accordance with the class determined by the class-determining means, said pixel having a color component which is not the color component of the pixel of interest.

44. The image-signal processing apparatus according to claim 43, characterized in that the characteristic-data generating section generates, as the characteristic data, a space activity of the pixels of each color component, which have been extracted by the extraction means.

45. The image-signal processing apparatus according to claim 44, characterized in that the characteristic-data generating section generates the space activity by performing of ADRC (Adaptive Dynamic Range Coding) process on the pixels of each color component.

46. The image-signal processing apparatus according to claim 43, characterized in that the extraction means extracts the pixels corresponding to each color component from pixels existing in a region near the pixel of interest.

47. An image-signal processing method of processing an input image signal at a position of each pixel, said input image signal having any one of various color components, said method comprising the steps of:
  extracting a plurality of pixels for each color component, from pixels located near each pixel of interest of the input image signal;
  generating characteristic data about the pixels of each color component, from the pixels of each color component which have been extracted in the extraction step and determining a class from the characteristic data generated for each color component; and
  generating a pixel in accordance with the class determined in the class-determining step, said pixel having a color component which is not the color component of the pixel of interest.

48. The image-signal processing method according to claim 47,
characterized in that in the characteristic-data generating step, a space activity of the pixels of each color component, which have been extracted in the extraction step, is generated as the characteristic data.

49. The image-signal processing method according to claim 48,
characterized in that in the class-determining step, the space activity is generated by performing of ADRC (Adaptive Dynamic Range Coding) process on the pixels of each color component.

50. The image-signal processing method according to claim 47, characterized in that the pixels corresponding to each color component from pixels existing in a region near the pixel of interest are extracted in the extraction step.

51. A non-transitory computer-readable medium storing a computer program designed to process an input image signal at a position of each pixel, said input image signal having any one of various color components, said computer program performing the steps comprised of:
  extracting a plurality of pixels for each color component, from pixels located near each pixel of interest of the input image signal;
  generating characteristic data about the pixels of each color component, from the pixels of each color component which have been extracted in the extraction step and determining a class from the characteristic data generated for each color component; and
  generating a pixel in accordance with the class determined in the class-determining step, said pixel having a color component which is not the color component of the pixel of interest.

52. The non-transitory medium according to claim 51, characterized in that in the characteristic-data generating step, a space activity of the pixels of each color component, which have been extracted in the extraction step, is generated as the characteristic data.

53. The non-transitory medium according to claim 52, characterized in that in the class-determining step, the space activity is generated by performing of ADRC (Adaptive Dynamic Range Coding) process on the pixels of each color component.

54. The non-transitory medium according to claim 51, characterized in that the pixels corresponding to each color component from pixels existing in a region near the pixel of interest are extracted in the extraction step.

* * * * *